US011261724B2

(12) United States Patent
Zheng et al.

(10) Patent No.: US 11,261,724 B2
(45) Date of Patent: Mar. 1, 2022

(54) DRILL BIT DISTANCE TO HOLE BOTTOM MEASUREMENT

(71) Applicant: Schlumberger Technology Corporation, Sugar Land, TX (US)

(72) Inventors: Shunfeng Zheng, Katy, TX (US); Benjamin Peter Jeffryes, Cambridge (GB); Jacques Orban, Katy, TX (US); Gokturk Tunc, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 184 days.

(21) Appl. No.: 14/899,873

(22) PCT Filed: Dec. 17, 2015

(86) PCT No.: PCT/US2015/066414
§ 371 (c)(1),
(2) Date: Dec. 18, 2015

(87) PCT Pub. No.: WO2016/100687
PCT Pub. Date: Jun. 23, 2016

(65) Prior Publication Data
US 2016/0369617 A1    Dec. 22, 2016

Related U.S. Application Data

(60) Provisional application No. 62/140,705, filed on Mar. 31, 2015, provisional application No. 62/094,502, filed on Dec. 19, 2014.

(51) Int. Cl.
*E21B 47/04*   (2012.01)
*E21B 44/00*   (2006.01)
(Continued)

(52) U.S. Cl.
CPC .............. *E21B 47/04* (2013.01); *E21B 19/00* (2013.01); *E21B 19/10* (2013.01); *E21B 44/00* (2013.01);
(Continued)

(58) Field of Classification Search
CPC ......... E21B 47/04; E21B 47/09; E21B 47/006
See application file for complete search history.

(56) References Cited

U.S. PATENT DOCUMENTS 3,882,474 A    5/1975    Cain
4,179,233 A    12/1979   Bromell et al.
(Continued)

FOREIGN PATENT DOCUMENTS

CA    2670700 A1    5/2008
CA    2700258 A1    3/2009
(Continued)

OTHER PUBLICATIONS

Wikipedia Entry for "Drill string" (https://en.wikipedia.org/wiki/Drill_string) (Year: 2019).

*Primary Examiner* — Taras P Bemko
(74) *Attorney, Agent, or Firm* — Alec J. McGinn

(57) ABSTRACT

Systems and methods for drilling a wellbore. The method includes measuring a first distance that a drilling device is raised while connected to a drill string, determining a weight-on-bit in the drill string, determining a second distance to lower the drilling device such that a drill bit at a lower extremity of the drill string approaches toward a bottom of the wellbore, based on the first distance and the weight-on-bit, and lowering the drilling device by the second distance.

15 Claims, 16 Drawing Sheets

(51) Int. Cl.

| | | |
|---|---|---|
| *E21B 44/02* | (2006.01) | |
| *E21B 19/00* | (2006.01) | |
| *E21B 19/10* | (2006.01) | |
| *E21B 47/00* | (2012.01) | |
| *E21B 47/09* | (2012.01) | |
| *E21B 7/04* | (2006.01) | |
| *E21B 44/04* | (2006.01) | |
| *E21B 7/06* | (2006.01) | |
| *E21B 47/022* | (2012.01) | |
| *E21B 47/007* | (2012.01) | |
| *G01B 11/22* | (2006.01) | |

(52) U.S. Cl.
CPC .............. *E21B 44/02* (2013.01); *E21B 47/00* (2013.01); *E21B 47/007* (2020.05); *E21B 47/09* (2013.01); *G01B 11/22* (2013.01); *E21B 7/04* (2013.01); *E21B 7/06* (2013.01); *E21B 44/04* (2013.01); *E21B 47/022* (2013.01)

(56) References Cited

U.S. PATENT DOCUMENTS

| | | | |
|---|---|---|---|
| 4,616,321 A | 10/1986 | Chan | |
| 5,062,048 A | 10/1991 | Coulter et al. | |
| 5,107,705 A | 4/1992 | Wraight et al. | |
| 5,202,680 A | 4/1993 | Savage | |
| 5,377,540 A | 1/1995 | Songe, Jr. et al. | |
| 5,705,812 A * | 1/1998 | Brewer ................. E21B 47/00 250/264 | |
| 5,894,895 A | 4/1999 | Welsh | |
| 6,151,961 A | 11/2000 | Huber et al. | |
| 6,745,487 B1 | 6/2004 | Nield | |
| 6,994,172 B2 | 2/2006 | Ray | |
| 7,874,351 B2 | 1/2011 | Hampton et al. | |
| 8,024,957 B2 | 9/2011 | McKee | |
| 8,172,007 B2 | 5/2012 | Dolman et al. | |
| 8,672,055 B2 | 3/2014 | Boone et al. | |
| 8,838,390 B1 | 9/2014 | Selman et al. | |
| 2002/0198661 A1 | 12/2002 | Strickland | |
| 2003/0221869 A1 | 12/2003 | Ireland | |
| 2003/0234119 A1 | 12/2003 | Ray | |
| 2004/0149031 A1 | 8/2004 | Bouchard | |
| 2004/0168827 A1 | 9/2004 | Jeffryes | |
| 2005/0193811 A1 | 9/2005 | Bilby et al. | |
| 2005/0194185 A1 | 9/2005 | Gleitman | |
| 2005/0216116 A1 | 9/2005 | Nield | |
| 2005/0217365 A1 | 10/2005 | Ekseth et al. | |
| 2006/0116823 A1 | 6/2006 | Griffiths | |
| 2008/0105427 A1 | 5/2008 | Hampton et al. | |
| 2008/0156531 A1 | 7/2008 | Boone et al. | |
| 2009/0090555 A1 * | 4/2009 | Boone ................. E21B 44/02 175/45 | |
| 2009/0205820 A1 | 8/2009 | Koederitz et al. | |
| 2009/0266610 A1 | 10/2009 | Farley | |
| 2009/0294174 A1 | 12/2009 | Harmer et al. | |
| 2010/0126717 A1 | 5/2010 | Kuchuk | |
| 2010/0193184 A1 | 8/2010 | Dolman et al. | |
| 2010/0307742 A1 | 12/2010 | Phillips et al. | |
| 2011/0085806 A1 | 4/2011 | Matsuda | |
| 2011/0088895 A1 | 4/2011 | Pop et al. | |
| 2011/0174541 A1 | 7/2011 | Strachan et al. | |
| 2012/0048618 A1 | 3/2012 | Zamanian et al. | |
| 2012/0118558 A1 | 5/2012 | Yoshiuchi et al. | |
| 2012/0143522 A1 | 6/2012 | Chen et al. | |
| 2012/0222900 A1 | 9/2012 | Rodney et al. | |
| 2013/0186685 A1 | 7/2013 | Martin | |
| 2013/0271576 A1 * | 10/2013 | Ellis ................. G06F 17/5009 348/46 | |
| 2013/0275100 A1 | 10/2013 | Ellis et al. | |
| 2013/0284434 A1 | 10/2013 | Marvel | |
| 2014/0022861 A1 | 1/2014 | Edme et al. | |
| 2014/0231141 A1 | 8/2014 | Hay et al. | |
| 2014/0262516 A1 | 9/2014 | Larson | |
| 2015/0134258 A1 | 5/2015 | Luppens et al. | |
| 2015/0219508 A1 | 8/2015 | Bryant et al. | |
| 2016/0115777 A1 | 4/2016 | Michou et al. | |
| 2016/0305230 A1 | 10/2016 | Benson et al. | |
| 2017/0328193 A1 | 11/2017 | Holt et al. | |

FOREIGN PATENT DOCUMENTS

| | | |
|---|---|---|
| CA | 2804354 A1 | 8/2014 |
| RU | 2013536 C1 | 5/1994 |
| RU | 2187638 C2 | 8/2002 |
| RU | 2217590 C2 | 11/2003 |
| RU | 2487238 C1 | 2/2012 |
| SU | 899877 A1 | 1/1982 |
| SU | 1361314 A1 | 12/1987 |
| SU | 1520237 A1 | 11/1989 |
| WO | 9805476 A1 | 2/1998 |
| WO | 2009039453 A2 | 3/2009 |
| WO | 2016160696 A1 | 10/2016 |
| WO | 2017095974 A1 | 6/2017 |

* cited by examiner

DRILL BIT DISTANCE TO HOLE BOTTOM MEASUREMENT

CROSS-REFERENCE TO RELATED APPLICATIONS

This application claims priority to U.S. Provisional Patent Application having Ser. No. 62/140,705, which was filed on Mar. 31, 2015, and to U.S. Provisional Patent Application having Ser. No. 62/094,502 which was filed on Dec. 19, 2014. The entirety of both of these priority applications is incorporated herein by reference.

BACKGROUND

In drilling operations, the length of the drill string may be monitored and updated by various instruments. Maintaining an accurate and generally up-to-date measure of the drill string length may have a variety of uses. For example, knowledge of the drill string length may facilitate maintaining operational safety. If drilling depth is not tracked properly, a driller may run the whole drill string into the rock at full speed without realizing the bottom end of the hole is approaching, potentially causing severe equipment damage and operational problems.

Another use is for depth correlation. For example, a specific target (e.g., a reservoir) may have a certain depth, or a kick-off point for a deviated section of a well may be specified in terms of drilling depth. Drill string length may be used as a proxy for the drilling depth, and thus, a drilling operator may recognize that such an event has occurred (or is to occur) when a certain string length is reached. Further, recorded event occurrences, logs, etc. may be linked to drilling depth through drill string length, which may provide insight into the subterranean formation properties.

Generally, drill string length is measured using an encoder at the drawworks of the rig. In many rigs, the drawworks is a winch that controls the raising and lowering of the travelling block, which in turn adjusts the elevation of the top drive and the drill string attached thereto. The encoder records the revolutions, or otherwise the angular position, of the winch, which in turn provides the distance that the travelling block has been lowered. When a stand is fully deployed, the block can be raised again using the drawworks, and the process can be repeated.

However, the drawworks encoder measurement may have an inherent error caused by the radius of the drill line layer relative to the center of the drawworks, the stretch of drill line under the hookload (which itself may fluctuate, e.g., by downhole pressures, etc.), and the like. Accordingly, a geolograph line is sometimes used to calibrate the drawworks encoder. The geolograph line is a cable that is attached directly to the top drive or the block. A cable retrieval system for the cable is provided, along with an encoding sensor, and both are attached to a fixed point on or near the rig floor. The geolograph line then travels up and down the derrick with the top drive while the encoder measures the amount of line being paid out or retrieved.

SUMMARY

Embodiments of the disclosure may provide a method for drilling a wellbore. The method includes measuring a first distance that a drilling device is raised while connected to a drill string, determining a weight-on-bit in the drill string, determining a second distance to lower the drilling device such that a drill bit at a lower extremity of the drill string approaches toward a bottom of the wellbore, based on the first distance and the weight-on-bit, and lowering the drilling device by the second distance.

Embodiments of the disclosure may also provide a drilling rig system. The system includes a drilling device configured to rotate a drill string, a rig floor through which the drill string is received, a drawworks coupled to the drilling device via a drill line, with the drawworks being configured to raise and lower the drilling device with respect to the rig floor by spooling and unspooling the drill line, a sensor configured to determine an elevation of the drilling device; and a computing device configured to cause the drilling rig system to perform operations. The operations include measuring a first distance that the drilling device is raised while connected to the drill string, determining a weight-on-bit in the drill string, determining a second distance to lower the drilling device such that a drill bit at a lower extremity of the drill string approaches toward a bottom of a wellbore, based on the first distance and the weight-on-bit, and lowering the drilling device by the second distance.

Embodiments of the disclosure may also provide a measurement system for a drilling rig. The system includes a plurality of elevation markers and a sensor configured to be moved by a drawworks of the drilling rig. The drawworks is configured to move a travelling block coupled to a drilling device of the drilling rig, and the sensor is also configured to determine an elevation of the drilling device by detecting the plurality of elevation markers.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Figure 1:
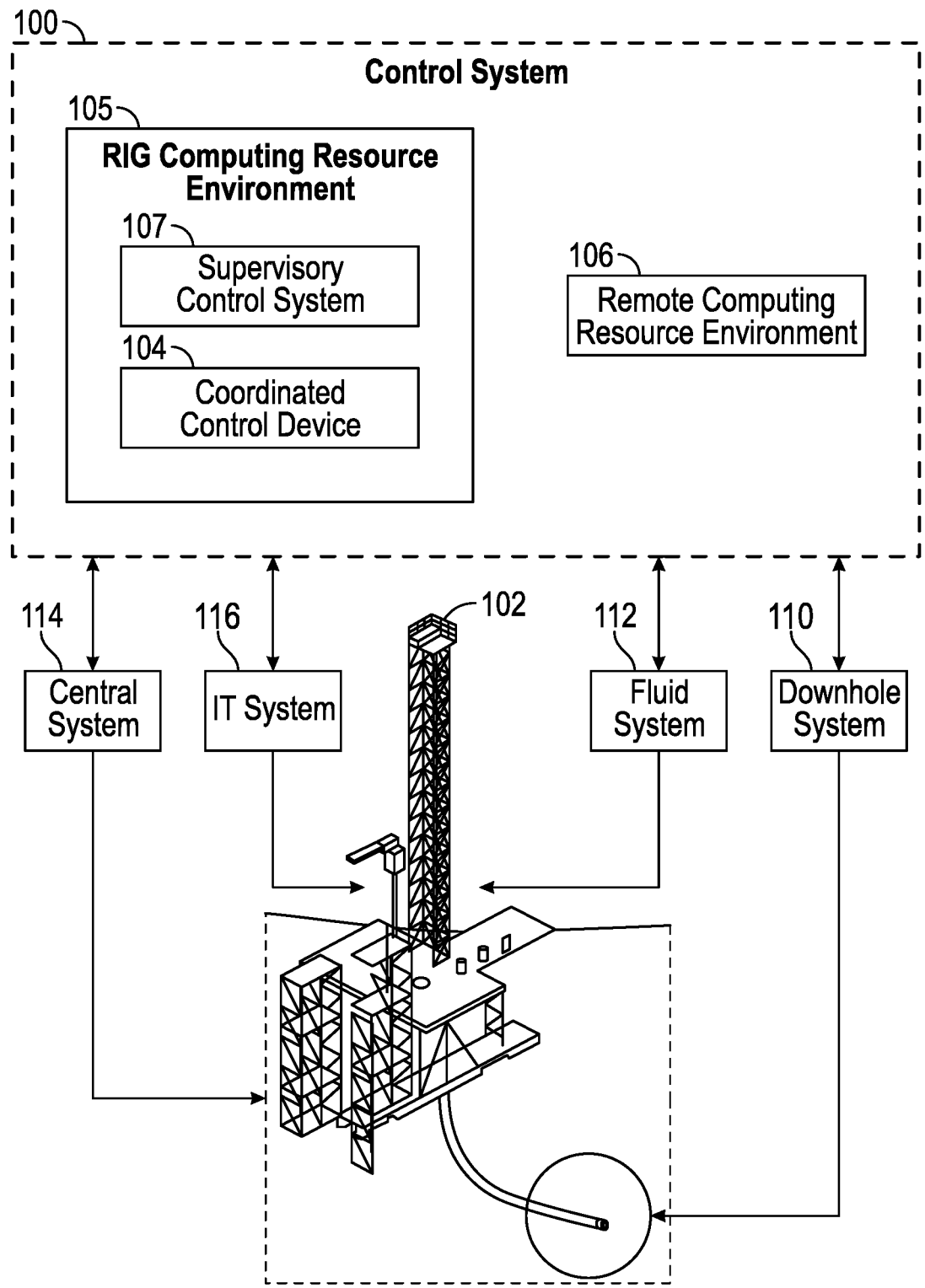
FIG. 1 illustrates a schematic view of a drilling rig and a control system, according to an embodiment.

FIG. 1 illustrates a conceptual, schematic view of a control system 100 for a drilling rig 102, according to an embodiment. The control system 100 may include a rig computing resource environment 105, which may be located onsite at the drilling rig 102 and, in some embodiments, may have a coordinated control device 104. The control system 100 may also provide a supervisory control system 107. In some embodiments, the control system 100 may include a remote computing resource environment 106, which may be located offsite from the drilling rig 102.

The remote computing resource environment 106 may include computing resources locating offsite from the drilling rig 102 and accessible over a network. A "cloud" computing environment is one example of a remote computing resource. The cloud computing environment may communicate with the rig computing resource environment 105 via a network connection (e.g., a WAN or LAN connection).

Further, the drilling rig 102 may include various systems with different sensors and equipment for performing operations of the drilling rig 102, and may be monitored and controlled via the control system 100, e.g., the rig computing resource environment 105. Additionally, the rig computing resource environment 105 may provide for secured access to rig data to facilitate onsite and offsite user devices monitoring the rig, sending control processes to the rig, and the like.

Various example systems of the drilling rig 102 are depicted in FIG. 1. For example, the drilling rig 102 may include a downhole system 110, a fluid system 112, and a central system 114. In some embodiments, the drilling rig 102 may include an information technology (IT) system 116. The downhole system 110 may include, for example, a bottomhole assembly (BHA), mud motors, sensors, etc. disposed along the drill string, and/or other drilling equipment configured to be deployed into the wellbore. Accordingly, the downhole system 110 may refer to tools disposed in the wellbore, e.g., as part of the drill string used to drill the well.

The fluid system 112 may include, for example, drilling mud, pumps, valves, cement, mud-loading equipment, mud-management equipment, pressure-management equipment, separators, and other fluids equipment. Accordingly, the fluid system 112 may perform fluid operations of the drilling rig 102.

The central system 114 may include a hoisting and rotating platform, top drives, rotary tables, kellys, drawworks, pumps, generators, tubular handling equipment, derricks, masts, substructures, and other suitable equipment. Accordingly, the central system 114 may perform power generation, hoisting, and rotating operations of the drilling rig 102, and serve as a support platform for drilling equipment and staging ground for rig operation, such as connection make up, etc. The IT system 116 may include software, computers, and other IT equipment for implementing IT operations of the drilling rig 102.

The control system 100, e.g., via the coordinated control device 104 of the rig computing resource environment 105, may monitor sensors from multiple systems of the drilling rig 102 and provide control commands to multiple systems of the drilling rig 102, such that sensor data from multiple systems may be used to provide control commands to the different systems of the drilling rig 102. For example, the system 100 may collect temporally and depth aligned surface data and downhole data from the drilling rig 102 and store the collected data for access onsite at the drilling rig 102 or offsite via the rig computing resource environment 105. Thus, the system 100 may provide monitoring capability. Additionally, the control system 100 may include supervisory control via the supervisory control system 107.

In some embodiments, one or more of the downhole system 110, fluid system 112, and/or central system 114 may be manufactured and/or operated by different vendors. In such an embodiment, certain systems may not be capable of unified control (e.g., due to different protocols, restrictions on control permissions, etc.). An embodiment of the control system 100 that is unified, may, however, provide control over the drilling rig 102 and its related systems (e.g., the downhole system 110, fluid system 112, and/or central system 114).

Figure 2:
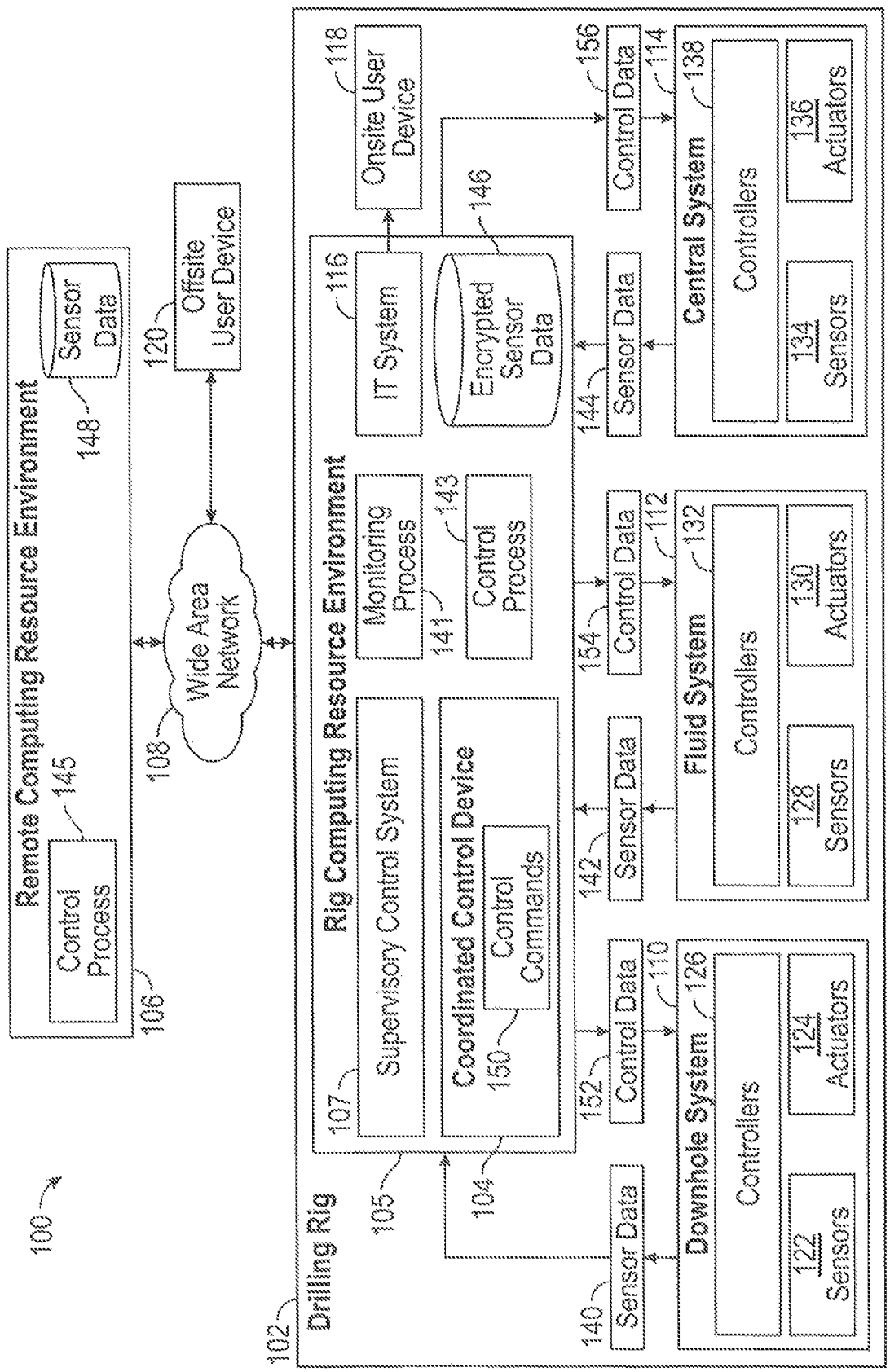
FIG. 2 illustrates a schematic view of a drilling rig and a remote computing resource environment, according to an embodiment.

FIG. 2 illustrates a conceptual, schematic view of the control system 100, according to an embodiment. The rig computing resource environment 105 may communicate with offsite devices and systems using a network 108 (e.g., a wide area network (WAN) such as the internet). Further, the rig computing resource environment 105 may communicate with the remote computing resource environment 106 via the network 108. FIG. 2 also depicts the aforementioned example systems of the drilling rig 102, such as the downhole system 110, the fluid system 112, the central system 114, and the IT system 116. In some embodiments, one or more onsite user devices 118 may also be included on the drilling rig 102. The onsite user devices 118 may interact with the IT system 116. The onsite user devices 118 may include any number of user devices, for example, stationary user devices intended to be stationed at the drilling rig 102 and/or portable user devices. In some embodiments, the onsite user devices 118 may include a desktop, a laptop, a smartphone, a personal data assistant (PDA), a tablet component, a wearable computer, or other suitable devices. In some embodiments, the onsite user devices 118 may communicate with the rig computing resource environment 105 of the drilling rig 102, the remote computing resource environment 106, or both.

One or more offsite user devices 120 may also be included in the system 100. The offsite user devices 120 may include a desktop, a laptop, a smartphone, a personal data assistant (PDA), a tablet component, a wearable computer, or other suitable devices. The offsite user devices 120 may be configured to receive and/or transmit information (e.g., monitoring functionality) from and/or to the drilling rig 102 via communication with the rig computing resource environment 105. In some embodiments, the offsite user devices 120 may provide control processes for controlling operation of the various systems of the drilling rig 102. In some embodiments, the offsite user devices 120 may communicate with the remote computing resource environment 106 via the network 108.

The systems of the drilling rig 102 may include various sensors, actuators, and controllers (e.g., programmable logic controllers (PLCs)). For example, the downhole system 110 may include sensors 122, actuators 124, and controllers 126. The fluid system 112 may include sensors 128, actuators 130, and controllers 132. Additionally, the central system 114 may include sensors 134, actuators 136, and controllers 138. The sensors 122, 128, and 134 may include any suitable sensors for operation of the drilling rig 102. In some embodiments, the sensors 122, 128, and 134 may include a camera, a pressure sensor, a temperature sensor, a flow rate sensor, a vibration sensor, a current sensor, a voltage sensor, a resistance sensor, a gesture detection sensor or device, a voice actuated or recognition device or sensor, or other suitable sensors.

The sensors described above may provide sensor data to the rig computing resource environment 105 (e.g., to the coordinated control device 104). For example, downhole system sensors 122 may provide sensor data 140, the fluid system sensors 128 may provide sensor data 142, and the central system sensors 134 may provide sensor data 144. The sensor data 140, 142, and 144 may include, for example, equipment operation status (e.g., on or off, up or down, set or release, etc.), drilling parameters (e.g., depth, hook load, torque, etc.), auxiliary parameters (e.g., vibration data of a pump) and other suitable data. In some embodiments, the acquired sensor data may include or be associated with a timestamp (e.g., a date, time or both) indicating when the sensor data was acquired. Further, the sensor data may be aligned with a depth or other drilling parameter.

Acquiring the sensor data at the coordinated control device 104 may facilitate measurement of the same physical properties at different locations of the drilling rig 102. In some embodiments, measurement of the same physical properties may be used for measurement redundancy to enable continued operation of the well. In yet another embodiment, measurements of the same physical properties at different locations may be used for detecting equipment conditions among different physical locations. The variation in measurements at different locations over time may be used to determine equipment performance, system performance, scheduled maintenance due dates, and the like. For example, slip status (e.g., in or out) may be acquired from the sensors and provided to the rig computing resource environment 105. In another example, acquisition of fluid samples may be measured by a sensor and related with bit depth and time measured by other sensors. Acquisition of data from a camera sensor may facilitate detection of arrival and/or installation of materials or equipment in the drilling rig 102. The time of arrival and/or installation of materials or equipment may be used to evaluate degradation of a material, scheduled maintenance of equipment, and other evaluations.

The coordinated control device 104 may facilitate control of individual systems (e.g., the central system 114, the downhole system, or fluid system 112, etc.) at the level of each individual system. For example, in the fluid system 112, sensor data 128 may be fed into the controller 132, which may respond to control the actuators 130. However, for control operations that involve multiple systems, the control may be coordinated through the coordinated control device 104. Examples of such coordinated control operations include the control of downhole pressure during tripping. The downhole pressure may be affected by both the fluid system 112 (e.g., pump rate and choke position) and the central system 114 (e.g. tripping speed). When it is desired to maintain certain downhole pressure during tripping, the coordinated control device 104 may be used to direct the appropriate control commands.

In some embodiments, control of the various systems of the drilling rig 102 may be provided via a three-tier control system that includes a first tier of the controllers 126, 132, and 138, a second tier of the coordinated control device 104, and a third tier of the supervisory control system 107. In other embodiments, coordinated control may be provided by one or more controllers of one or more of the drilling rig systems 110, 112, and 114 without the use of a coordinated control device 104. In such embodiments, the rig computing resource environment 105 may provide control processes directly to these controllers for coordinated control. For example, in some embodiments, the controllers 126 and the controllers 132 may be used for coordinated control of multiple systems of the drilling rig 102.

The sensor data 140, 142, and 144 may be received by the coordinated control device 104 and used for control of the drilling rig 102 and the drilling rig systems 110, 112, and 114. In some embodiments, the sensor data 140, 142, and 144 may be encrypted to produce encrypted sensor data 146. For example, in some embodiments, the rig computing resource environment 105 may encrypt sensor data from different types of sensors and systems to produce a set of encrypted sensor data 146. Thus, the encrypted sensor data 146 may not be viewable by unauthorized user devices (either offsite or onsite user device) if such devices gain access to one or more networks of the drilling rig 102. The encrypted sensor data 146 may include a timestamp and an aligned drilling parameter (e.g., depth) as discussed above. The encrypted sensor data 146 may be sent to the remote computing resource environment 106 via the network 108 and stored as encrypted sensor data 148.

The rig computing resource environment 105 may provide the encrypted sensor data 148 available for viewing and processing offsite, such as via offsite user devices 120. Access to the encrypted sensor data 146 may be restricted via access control implemented in the rig computing resource environment 105. In some embodiments, the encrypted sensor data 146 may be provided in real-time to offsite user devices 120 such that offsite personnel may view real-time status of the drilling rig 102 and provide feedback based on the real-time sensor data. For example, different portions of the encrypted sensor data 146 may be sent to offsite user devices 120. In some embodiments, encrypted sensor data may be decrypted by the rig computing resource environment 105 before transmission or decrypted on an offsite user device after encrypted sensor data is received.

The offsite user device 120 may include a thin client configured to display data received from the rig computing resource environment 105 and/or the remote computing resource environment 106. For example, multiple types of thin clients (e.g., devices with display capability and minimal processing capability) may be used for certain functions or for viewing various sensor data.

The rig computing resource environment 105 may include various computing resources used for monitoring and controlling operations such as one or more computers having a processor and a memory. For example, the coordinated control device 104 may include a computer having a processor and memory for processing sensor data, storing sensor data, and issuing control commands responsive to sensor data. As noted above, the coordinated control device 104 may control various operations of the various systems of the drilling rig 102 via analysis of sensor data from one or more drilling rig systems (e.g. 110, 112, 114) to enable coordinated control between each system of the drilling rig 102. The coordinated control device 104 may execute control commands 150 for control of the various systems of the drilling rig 102 (e.g., drilling rig systems 110, 112, 114). The coordinated control device 104 may send control data determined by the execution of the control commands 150 to one or more systems of the drilling rig 102. For example, control data 152 may be sent to the downhole system 110, control data 154 may be sent to the fluid system 112, and control data 154 may be sent to the central system 114. The control data may include, for example, operator commands (e.g., turn on or off a pump, switch on or off a valve, update a physical property setpoint, etc.). In some embodiments, the coordinated control device 104 may include a fast control loop that directly obtains sensor data 140, 142, and 144 and executes, for example, a control algorithm. In some embodiments, the coordinated control device 104 may include a slow control loop that obtains data via the rig computing resource environment 105 to generate control commands.

In some embodiments, the coordinated control device 104 may intermediate between the supervisory control system 107 and the controllers 126, 132, and 138 of the systems 110, 112, and 114. For example, in such embodiments, a supervisory control system 107 may be used to control systems of the drilling rig 102. The supervisory control system 107 may include, for example, devices for entering control commands to perform operations of systems of the drilling rig 102. In some embodiments, the coordinated control device 104 may receive commands from the supervisory control system 107, process the commands according to a rule (e.g., an algorithm based upon the laws of physics for drilling operations), and/or control processes received from the rig computing resource environment 105, and provides control data to one or more systems of the drilling rig 102. In some embodiments, the supervisory control system 107 may be provided by and/or controlled by a third party. In such embodiments, the coordinated control device 104 may coordinate control between discrete supervisory control systems and the systems 110, 112, and 114 while using control commands that may be optimized from the sensor data received from the systems 110 112, and 114 and analyzed via the rig computing resource environment 105.

The rig computing resource environment 105 may include a monitoring process 141 that may use sensor data to determine information about the drilling rig 102. For example, in some embodiments the monitoring process 141 may determine a drilling state, equipment health, system health, a maintenance schedule, or any combination thereof. In some embodiments, the rig computing resource environment 105 may include control processes 143 that may use the sensor data 146 to optimize drilling operations, such as, for example, the control of drilling equipment to improve drilling efficiency, equipment reliability, and the like. For example, in some embodiments the acquired sensor data may be used to derive a noise cancellation scheme to improve electromagnetic and mud pulse telemetry signal processing. The control processes 143 may be implemented via, for example, a control algorithm, a computer program, firmware, or other suitable hardware and/or software. In some embodiments, the remote computing resource environment 106 may include a control process 145 that may be provided to the rig computing resource environment 105.

The rig computing resource environment 105 may include various computing resources, such as, for example, a single computer or multiple computers. In some embodiments, the rig computing resource environment 105 may include a virtual computer system and a virtual database or other virtual structure for collected data. The virtual computer system and virtual database may include one or more resource interfaces (e.g., web interfaces) that enable the submission of application programming interface (API) calls to the various resources through a request. In addition, each of the resources may include one or more resource interfaces that enable the resources to access each other (e.g., to enable a virtual computer system of the computing resource environment to store data in or retrieve data from the database or other structure for collected data).

The virtual computer system may include a collection of computing resources configured to instantiate virtual machine instances. A user may interface with the virtual computer system via the offsite user device or, in some embodiments, the onsite user device. In some embodiments, other computer systems or computer system services may be utilized in the rig computing resource environment 105, such as a computer system or computer system service that provisions computing resources on dedicated or shared computers/servers and/or other physical devices. In some embodiments, the rig computing resource environment 105 may include a single server (in a discrete hardware component or as a virtual server) or multiple servers (e.g., web servers, application servers, or other servers). The servers may be, for example, computers arranged in any physical and/or virtual configuration In some embodiments, the rig computing resource environment 105 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 118 and/or offsite user device 120) accessing the rig computing resource environment 105. In some embodiments, the remote computing resource environment 106 may include similar computing resources to those described above, such as a single computer or multiple computers (in discrete hardware components or virtual computer systems).

In an embodiment, the rig may include slips located at the rig floor. The slips may be provided with sensors to register a transition of the weight bearing between the hook line (via the top drive) and the slips. In addition, when running tubulars into the well, at some point, the top of the tubular may be a few feet from the top of the rig. The system may employ a high resolution positioning sensor for determining where in the mast of where the hook was. The hook then gets another stand of tubular, connects the stand on the tubular string, and then the hook picks up the weight out of the slips. The pick up transition moment may occur when the weight disappears from the slips and appears on the hook. Accordingly, the elevation of the hook (and/or the top drive, etc.) may be recorded when the hook holds the weight, as determined by the transition recorded in the slip sensors (and/or the top drive sensors). This may yield an accurate measurement of the stand length in a stretched condition, e.g., as the weight of the drill string is transmitted therethrough.

Elevation Measurement System

Figure 3A:
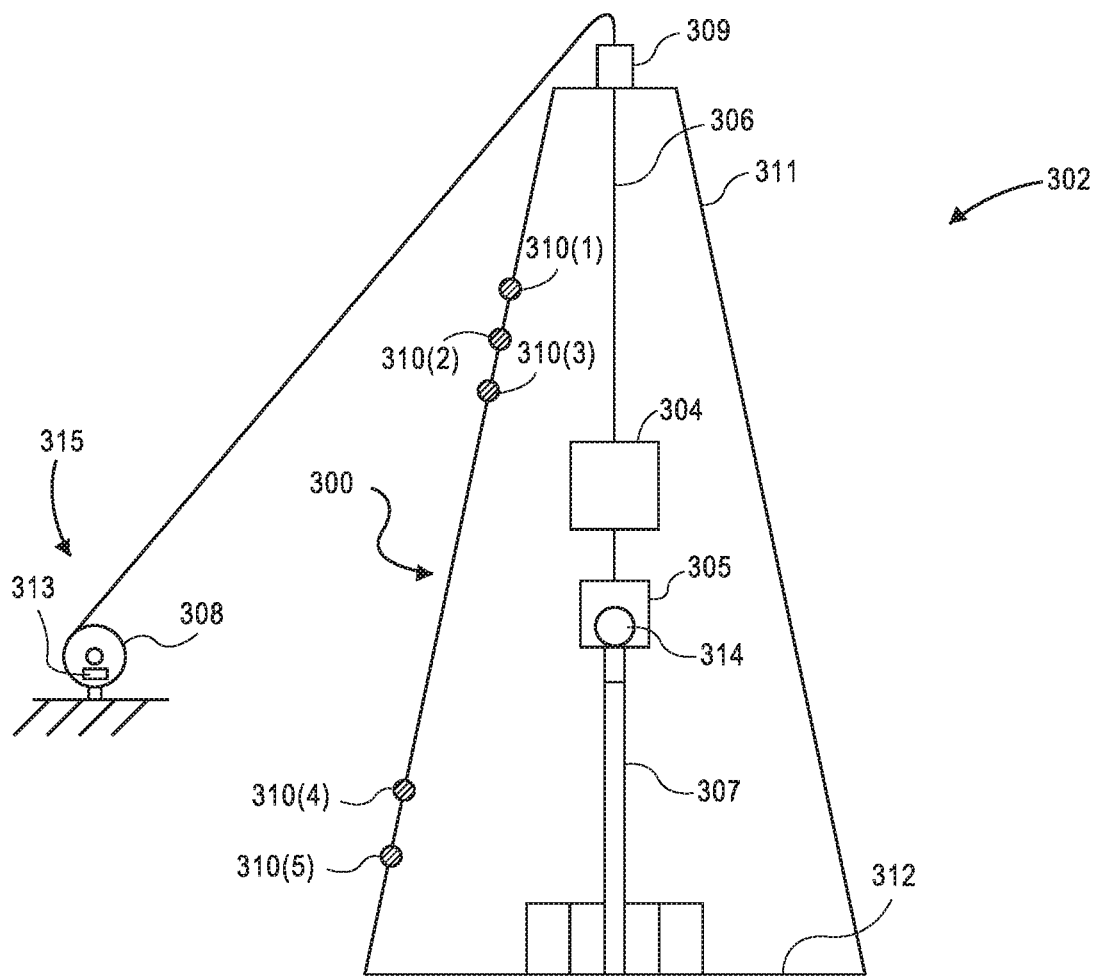
FIGS. 3A, 3B, and 3C illustrate conceptual, side, schematic views of three embodiments of an automated calibration system.

FIG. 3A illustrates a side, schematic view of a drilling rig 302 including an automated calibration system 300, according to an embodiment. The drilling rig 302 generally includes a travelling block 304 that is hoisted by a cable or "drill line" 306 that may be attached to and movable by a drum 308 of a drawworks 315. The drilling rig 302 may also include a drilling device 305, which may be or include a kelly or a top drive. The drilling device 305 may be supported (e.g., suspended) from the travelling block 304 and may be configured to rotate a tubular segment, such as a drill string 307 (e.g., one or more drill pipes) so as to drill a wellbore in the Earth. The drilling rig 302 may also include a crown block 309, positioned at the top of the rig 302, and a structural component 311, which may be a part of, for example, a derrick of the rig 302.

The drawworks 315 may include a "primary" elevation measurement device, such as an encoder 313. The encoder 313 may be configured to measure a rotation in the drum 308, from which the elevation of the drilling device 305 may be calculated. In turn, the depth of the drill string 307 may be determined by keeping track of the amount of the "run-in" of the drill line 306 through the encoder 313 when the drilling device 305 is coupled with drill string. However, the encoder 313 (or another device of the elevation measurement device) may not be responsive to stretching of the drill line 306 and other potential dynamic errors in the depth calculation based on the rotation of the drum 308.

The system 300 may include a calibration sensor 314 that may move with the drilling device 305. In an embodiment, the sensor 314 may be installed in or on the drilling device 305, as shown, but in others, it may be attached to the travelling block 304 or elsewhere (e.g., "coupled" to the drilling device 305). The system 300 may further include a plurality of elevation markers (five shown: 310(1), 310(2), 310(3), 310(4), 310(5)), which may be installed on the structural component 311 and may be stationary relative to the structural component 311. For example, one or more the markers 310(1)-(3) may be installed near the top of the rig 302, e.g., near the top of the range of motion for the drilling device 305, and one or more of the markers 310(4)-(5) may be installed near a rig floor 312 of the rig 302, e.g., near the bottom of the range of motion for the drilling device 305. Still another one or more of the markers may be installed on the rig along the travelling range of the top drive. In other embodiments, the markers 310(1)-(5) may be more uniformly positioned along the range of vertical motion for the drilling device 305.

The elevation of the elevation markers 310(1)-(5) may be predetermined. For example, the elevation may be measured from a fixed reference point, such as a vertical distance from the rig floor 312. In another embodiment, the elevation may be relative, e.g., a vertical distance between two of the markers 310(1)-(5).

The elevation markers 310(1)-(5) may each include a unique (among the markers 310(1)-(5)) identifier, such as A, B, C, etc., although any suitable format for such identifiers may be employed. The identifier may be associated with the elevation of the markers 310(1)-(5), e.g., in a database. In some embodiments, the elevation markers 310(1)-(5) may be passive, visual indicators. In other embodiments, the elevation markers 310(1)-(5) may be or include a transceiver that may emit a signal representing the identifier.

The sensor 314 may recognize and differentiate between the elevation markers 310(1)-(5). For example, the sensor 314 may recognize a visual feature of the elevation markers 310(1)-(5) and thus determine which of the markers 310(1)-(5) that the sensor 314 is viewing, e.g., when aligned horizontally therewith. The sensor 314 may also be a transceiver that receives the signal emitted from the markers 310(1)-(5) when the sensor 314 is horizontally aligned with a particular marker 310(1)-(5). For example, the sensor 314 may be an optical sensor, and the elevation markers 310(1)-(5) may include lasers that emit light beams with different frequencies from one another. In other embodiments, the sensor 314 may be a radiofrequency identification (RFID) tag reader, and the markers 310(1)-(5) may be RFID tags. In still other embodiments, the markers 310(1)-(5) may be audio emitters, or any other type of marker.

Figure 3B:
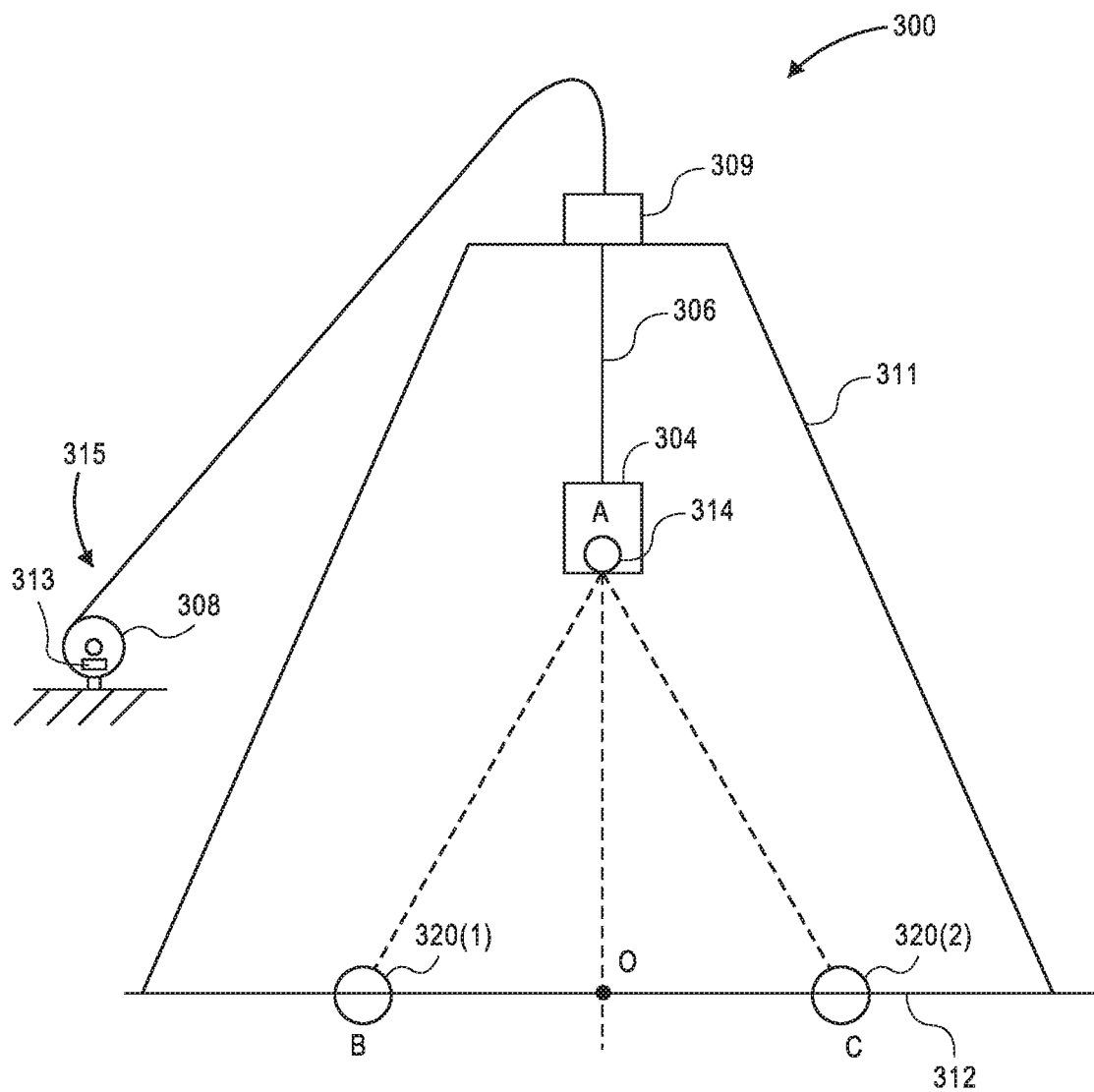

FIG. 3B illustrates a side, schematic view of another embodiment of the automated system 300. In this embodiment, rather than basing the elevation measurement on alignment with vertical markers, the system 300 includes markers 320(1) and 320(2), which are located at the same elevation as one another, e.g., at or near the rig floor 312. The sensor 314 may be positioned on the block 304, in an embodiment, as shown, but in another embodiment, may be positioned on the drilling device 305 (FIG. 3A) or elsewhere on a structure that is moved vertically by movement of the drum 308.

The markers 320(1), 320(2) may be active, and configured to determine a distance to the sensor 314. In another embodiment, the markers 320(1), 320(2) may be configured to measure the angular position of the sensor 314, namely, angles $\angle ABC$ and $\angle ACB$. The markers 320(1), 320(2) may thus be considered transceivers. In other embodiments, the markers 320(1), 320(2) may be passive, reflective, etc. A combination of the sensor 314 and the markers 320(1), 320(2) may enable a distance determination or an angular position determination therebetween, e.g., using ultrasonic, laser, camera, radar, or any other suitable method for determining a straight line distance between two points.

Further, the sensor 314 may be located at a point A, while the markers 320(1), 320(2) may be located at points B and C, respectively. The well center is denoted by O. The distance along line BC may be static, as the markers 320(1), 320(2) may be stationary with respect to the rig structural component 311. The distance along line AB may change, as may the distance along line AC, i.e., between the sensor 314 and the markers 320(1), 320(2) as the block 304, for example, is raised and lowered. Thus, the distances AB and BC may be measured using the combination of the sensor 314 and the markers 320(1), 320(2). As such, the distance AO may be calculated based on triangulation, as:

$$AO = \sqrt{AB^2 - \left(\frac{BC^2 + AB^2 - AC^2}{2BC}\right)^2} \quad (1)$$

Although the markers 320(1), 320(2) are shown at the rig floor 312, and thus configured to measure the distance from the rig floor 312 to the block 304, the markers 320(1), 320(2) may be placed at any position below the block 304, and the calculation would change simply by adding an offset equal to the height above the rig floor 312. Further, the markers 320(1), (2) may also be placed above the block 304, and may be used to measure the distance of the travelling block 304 from the the crown block 309, or any other structure above the block 304 (and/or the drilling device 305, depending on the location of the calibration sensor 314). Similar expressions for the distance AO may be determined based on the angular position measurements, given the distance between the markers 320(1), 320(2).

In some embodiments, more than two markers 320(1), 320(2) may be employed. For example, a third marker may be provided. The sensor 314 may sense the third marker in addition to the first and second markers 320(1), 320(2), and a signal quality for the first, second, and third markers may be determined. The sensor 314 (or a controller) may then select to employ measurements determined with respect to the first and second markers 320(1), 320(2) over the measurements determined with respect to the third marker, based on the signal quality (e.g., select the two signals with the higher quality), Moreover, the markers 320(1), 320(2) may be positioned at different elevations. For example, in FIG. 3C, there is illustrated a side, schematic view of such an embodiment of the system 300. The embodiment of FIG. 3C may be similar to that of FIG. 3B, in that markers 320(1), 320(2) are employed for purposes of triangulating an elevation of the block 304 (or drilling device 305, see FIG. 3A) above the rig floor 312. However, instead of placing both markers 320(1), 320(2) at the rig floor 312, one marker 320(2) may be positioned on a vertically-extending portion of the rig structural component 311, as shown, at a different (e.g., higher) elevation than the marker 320(1).

A reference point E may be selected on the rig floor 312, or at another location having the same elevation from the rig floor 312 as the marker 320(1). Since points B, C, and E are stationary, the lengths of lines BE, BC, and CE are known. Further, the angle y between lines BC and CE is known. Therefore, the angle x between lines AC and BC may be determined as:

$$x = \arccos\frac{BC^2 + AC^2 - AB^2}{2*BC*AC} \quad (2)$$

Thus, the length of line AE may be calculated as:

$$AE^2 = AC^2 + CE^2 - 2*AC*CE*\cos(x+y) \quad (3)$$

With the length of line AE known, the calculation is similar to that discussed above with respect to FIG. 3A, and the length AE may be used in equation 1 instead of AC to solve for AO, which is the elevation of the block 304 (or drilling device 305). One of ordinary skill in the art will, with the aid of the present disclosure, be able to implement a multitude of different ways to accomplish this triangulation using the system 300 including the calibration sensor 314 and the markers 320(1), 320(2), and thus it should be appreciated that the above-described positions for the markers 320(1), 320(2) and the calculations based thereon represent merely an example of such triangulation.

Figure 3C:
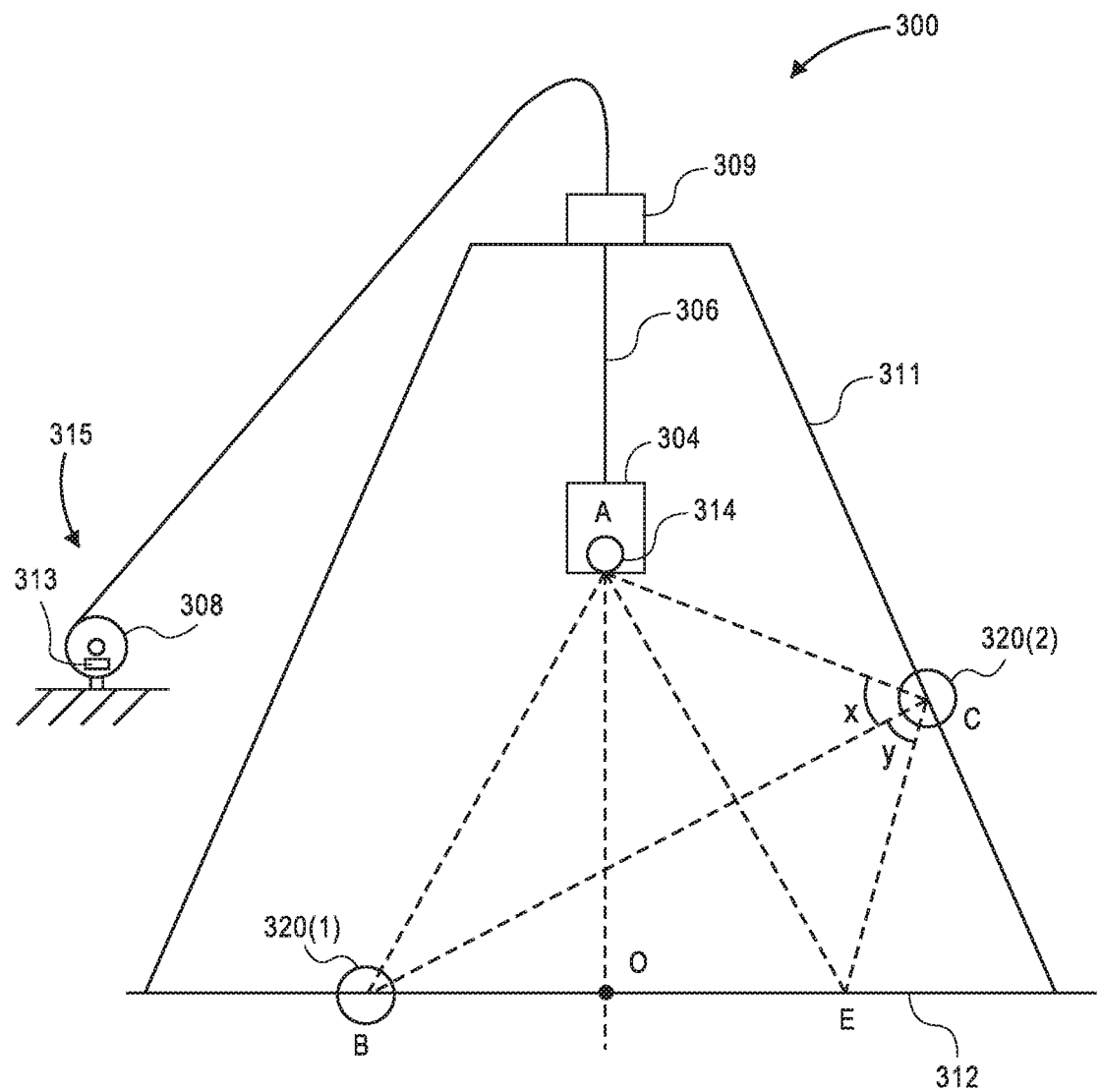

The triangulation technique, as described in FIGS. 3B & 3C, may be used for calibrating a primary depth measurement system, which is described below. In some embodiments, such triangulation using the markers 320(1), 320(2) may be used as a primary depth measurement system. Since measurements of distance between the sensor 314 and the markers 320(1), 320(2), and/or the angular position of sensor 314 with respect to markers 320(1), 320(2) may be made continuously, elevation AO may thus be determined continuously during the movement of the block 304. In this way, the encoder 313 may be used as a backup or a secondary depth measurement system. As the term is used herein, "continuously" refers to a regime in which measurements are taken at a certain rate or frequency, which may provide a short interval therebetween, e.g., during the drilling process.

Calibrating a Drilling Depth Measurement Using the Elevation Measurement System

In operation, the calculation of the drill string 307 length based on the rotation measured by the encoder 313 may become inaccurate. For example, the drill line 306 may stretch over time. Further, other factors may cause the calculation to be inaccurate. As such, a given angular movement of the drum 308 may move the drilling device 305 by one elevation at one time, and the same angular movement of the drum 308 may result in a different elevation change at another time.

Figure 4A:
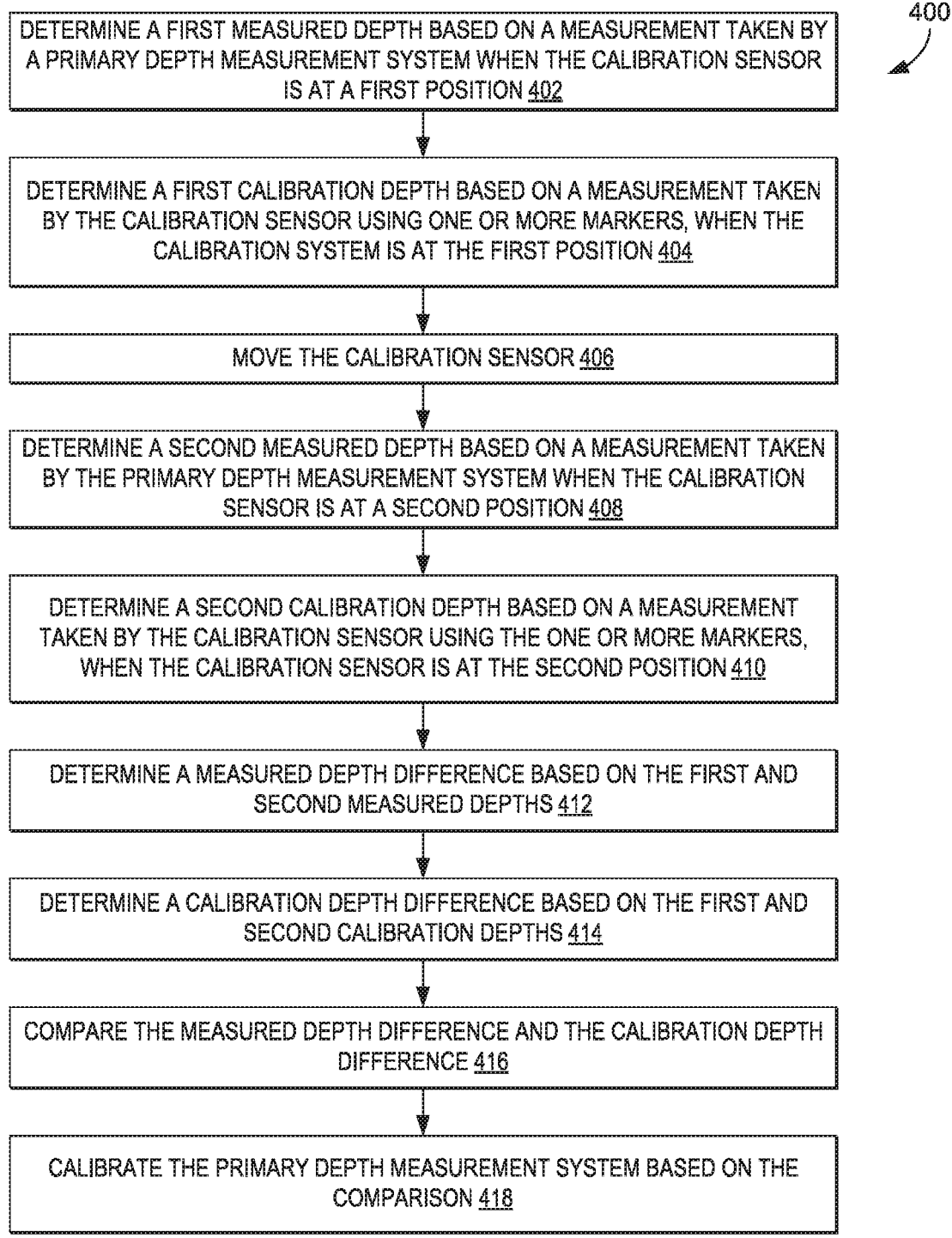
FIG. 4A illustrates a flowchart of a method for automated calibration of a drilling depth measurement, according to an embodiment.

Accordingly, FIG. 4A illustrates a flowchart of a method 400 for calibrating a drilling depth measurement, according to an embodiment. The method 400 may be employed by operation of the system 300 and is thus explained herein with reference thereto; however, it will be appreciated that the method 400 may, in some embodiments, be employed by operation of other systems.

Figure 4B:
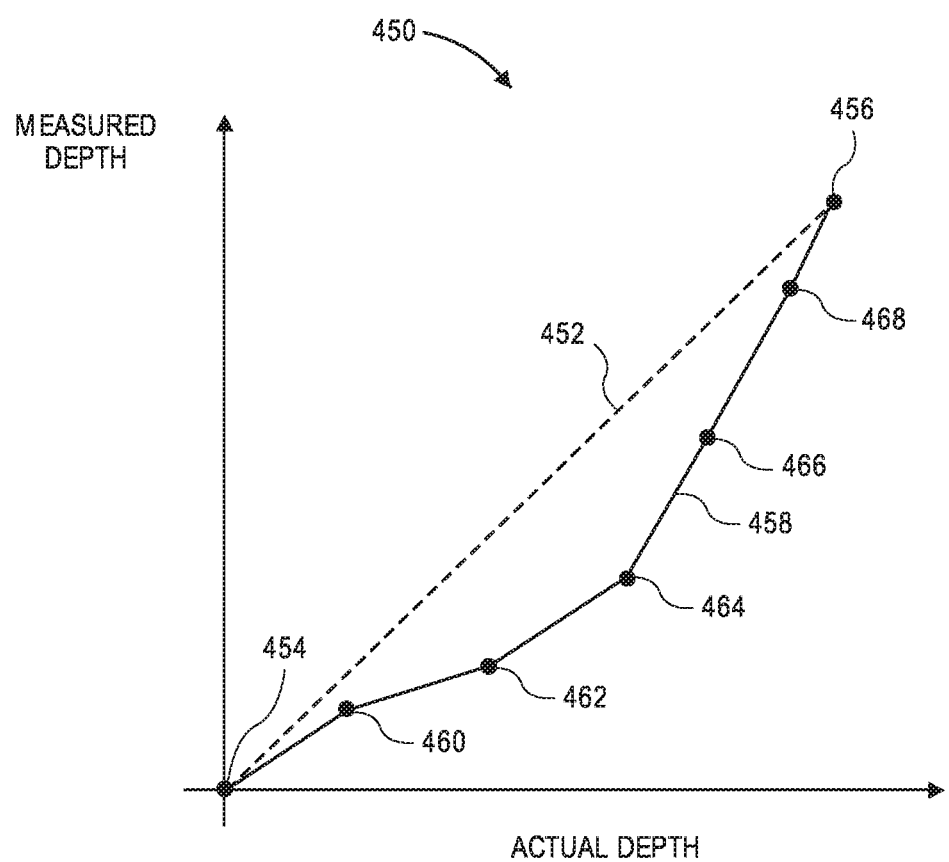
FIG. 4B illustrates a plot of actual versus measured depth in a calibrated system and in an uncalibrated system, according to an embodiment.

FIG. 4B illustrates a plot 450 of the measured depth versus actual depth, according to an illustrative example. The plot 450 specifically illustrates a comparison between measurements taken an uncalibrated elevation measurement device (line 452) and in a calibrated device (line 458). The uncalibrated device may operate under the assumption that measured depth equals actual depth as between two known depths (e.g., the beginning of a stand or joint being run-in and at the end thereof). The calibrated device may account for variations from such a line 452.

In general, the method 400 may include determining a measured depth difference between a first position of a calibration sensor and a second position of the calibration sensor, based on measurements taken by an elevation measurement device. Further, the method 400 may include determining a measured depth difference between the first and second positions based on measurements taken by the calibration sensor using one or more markers. The method 400 may also include calibrating the elevation measurement device based at least partially on a relationship between the measured depth difference and the calibration depth difference.

Referring to the embodiment specifically illustrated in FIG. 4A, and additionally referring to FIG. 4B, the method 400 may begin by determining a first measured depth using a elevation measurement device (e.g., the encoder 313), when the calibration sensor 314 is at a first position, as at 402. This may occur at any time during the running/handling of a tubular segment. For example, in the embodiment of FIG. 3A, this may occur when the calibration sensor 314 reads a first elevation marker, which may be any elevation marker 310(1)-(5), for example, the elevation marker 310 (5). The elevation measurement device may accomplish this by measuring an angular displacement of the drum 308, which may be converted into a measured depth.

The method 400 may also include determining a first calibration depth based on a measurement taken by the calibration sensor 314, using one or more of the markers 310(1)-(5) and/or 320(1), 320(2), as at 404. In an embodiment, such as that shown in FIG. 3A, the calibration sensor 314 may accomplish this by determining an elevation of the elevation marker 310(5). In a specific embodiment, the calibration sensor 314 may acquire an identifier from the elevation marker 310(5), and determine the elevation of the elevation marker 310(5) by referring to a database storing the elevation thereof in association with the identifier. In the triangulation embodiments of FIGS. 3B and 3C, the calibration sensor 314 may directly determine its elevation by triangulation using the markers 320(1), (2). In FIG. 4B, the first calibration depth measurement taken by the calibration sensor 314 is indicated at 454.

The method 400 may also include moving the calibration sensor 314, e.g., by moving the travelling block 304 and/or the drilling device 305, as at 406. Such movement of the block 304 and/or drilling device 305 may be accomplished using the drawworks 315 (e.g., by rotating the drum 308), and thus the elevation measurement device may register at least a part of this change.

The method 400 may then include determining a second measured depth based on a measurement taken by the elevation measurement device when the calibration sensor is at a second position, as at 408. This may occur at any time during the running of a tubular segment after the calibration sensor 314 is moved from the first position at 404. For example, in the embodiment of FIG. 3A, this may occur when the calibration sensor 314 reads a second elevation marker, which may be any elevation marker 310(1)-(5), for example, the elevation marker 310(4) that is vertically adjacent to the elevation marker 310(5). The elevation measurement device may again accomplish this by registering an angular displacement of the drum 308.

The method 400 may then proceed to determining a second calibration depth based on a measurement taken by the calibration sensor 314 using one or more of the markers 310(1)-(5) and/or the markers 320(1), (2), as at 410. For example, the calibration sensor 314 may determine an elevation of the elevation marker 310(4) through acquisition of an identifier and reference to a database linking the identifier to a predetermined elevation. In the triangulation embodiments of FIGS. 3B and 3C, the calibration sensor 314 may again directly determine its elevation by triangulation.

The second calibration depth measurement is indicated at 462 in FIG. 4B. As can be seen, the second depth measurement 462 may deviate from the measured depth in an uncalibrated device along line 452.

The method 400 may also include determining a measured depth difference between the first and second positions, based on the first and second measured depths, as measured by the elevation measurement device, as at 412. The method 400 may further include determining a calibration depth difference between the first and second positions, as at 414. This may be based on the depth measurements taken by the calibration sensor 314 using any one or more of the sensors 310(1)-(5) or 320(1), (2).

Since the rig structural component 311 may be generally static (e.g., as compared to the movable drum 308, drill line 306, etc.), the distance between adjacent elevation markers 310(4) and 310(5) and/or the position of the triangulation markers 320(1), 320(2) may remain relatively constant. The measured depth difference from the elevation measurement device (e.g., encoder 313 at the drum 308 of the drawworks 315), however, may be more prone to error, and thus may be calibrated against the calibration depth.

As such, the measured depth difference determined at 412 may be compared to the calibration depth difference determined at 414, in order to adjust the elevation measurement device, when appropriate, as at 416. For example, the angular displacement of the drum 308 as the drilling device 305 moves from the first position to the second position may be compared to the calibration depth difference, so as to develop a relationship between these two values. In this way, as an example, the method 400 may include calibrating the elevation measurement device based on the comparison at 416, as at 418. This process may, for example, be repeated for one, some, or all of the other elevation markers 310(3), 310(2), 310(1), or similarly at a plurality of different times, intervals, at user discretion, etc. (e.g., with a triangulation embodiment), e.g., as indicated in FIG. 4B at 464, 466, and 468, respectively. Thus, the higher resolution provided by the calibration may allow for an interpolation of the precise position of the drill string during run-in.

In a specific example, the acquisition clock of the sensor 314 may be synched with the clock for the drawworks 315. When, for example, at the two positions, the absolute elevation difference is $\Delta L_a$, and the corresponding drawworks encoder reading between two elevation points is $\Delta L_e$. The calibration coefficient $\zeta$ may thus be established as:

$$\zeta = \frac{\Delta L_a}{\Delta L_e} \quad (4)$$

This calibration coefficient $\zeta$ may be used to calibrate the depth measurements taken using the elevation measurement device (e.g., encoder 313 at the drum 308). For example, the measured elevation may be multiplied by the calibration coefficient. At a next calibration opportunity, either according to the operator's choice, or any time the drilling device 305 and/or travelling block 304 passes the next elevation markers 310(1)-(5), another calibration coefficient may be calculated. As such, calibration may be done automatically. In some embodiments, any two adjacent elevation markers may yield a new calibration coefficient.

Figure 5:
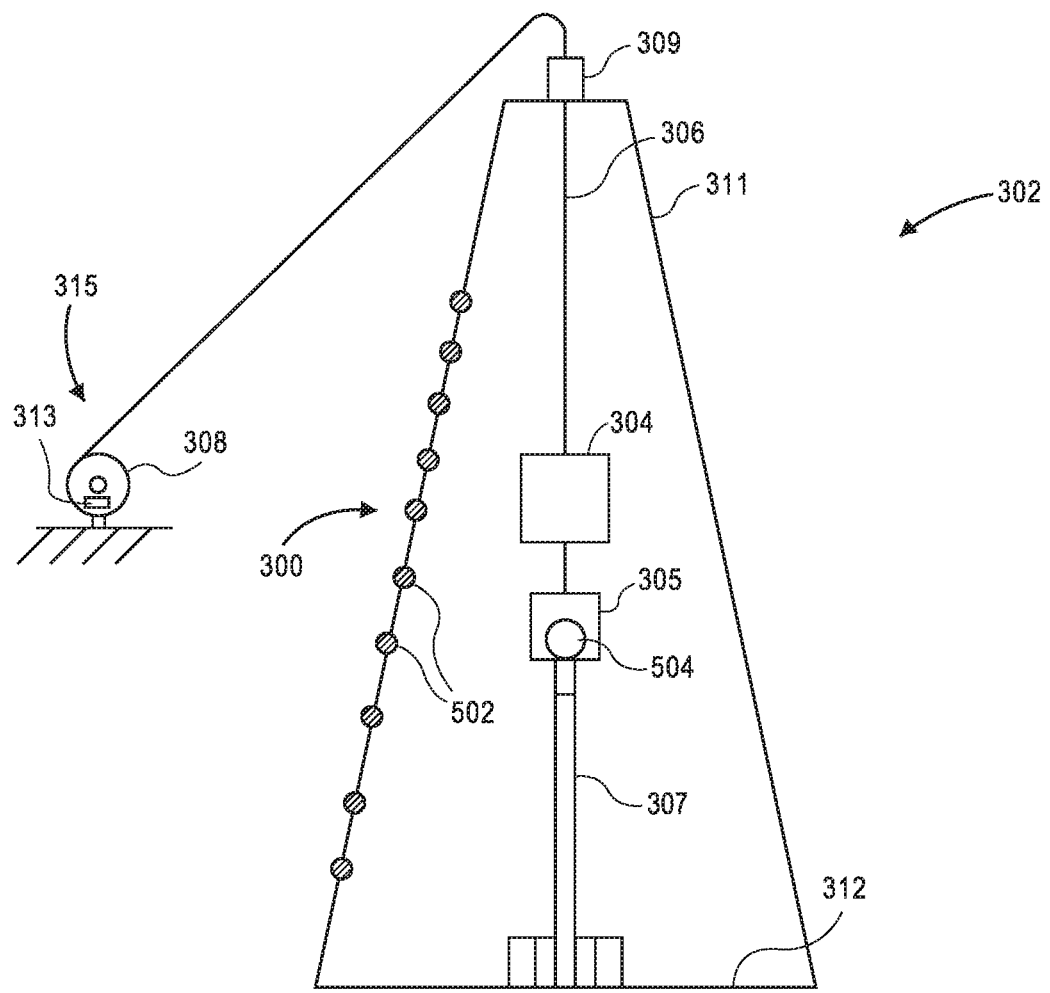
FIGS. 5 and 6 illustrate schematic views of an automated calibration system, according to an embodiment.

FIG. 5 illustrates another calibration system 500, according to an embodiment. The system 500 may also include a plurality of elevation markers 502, which may be installed on the rig structural component 311. The markers 502 may be associated with an elevation above the rig floor 312.

In this embodiment, the calibration sensor 314 (FIG. 3) may be provided by a camera 504, which may be installed on the travelling block 304 and/or the drilling device 305. When a particular marker 502 is in the field of view of the camera 504, the camera 504 may read the marker 502. A controller coupled to or integral with the camera 504 may differentiate the markers 502 by a feature or indicator that is unique to the individual markers 502, such as a letter, color, bar code, or the like. In another embodiment, the controller may count the number of markers 502 that have passed, e.g., without distinguishing individual markers 502, and with the markers 502 being positioned at uniform intervals. By matching the reading from the camera 504 with the associated elevation of the marker, the depth of the block position can be determined. The resolution of the depth measurement may thus be controlled by the resolution of the markers 502. Moreover, any elevation reading from two adjacent markers 310(1)-(5) may be used to calibrate the elevation measurement device for depth measurement near these two adjacent markers.

Figure 6:
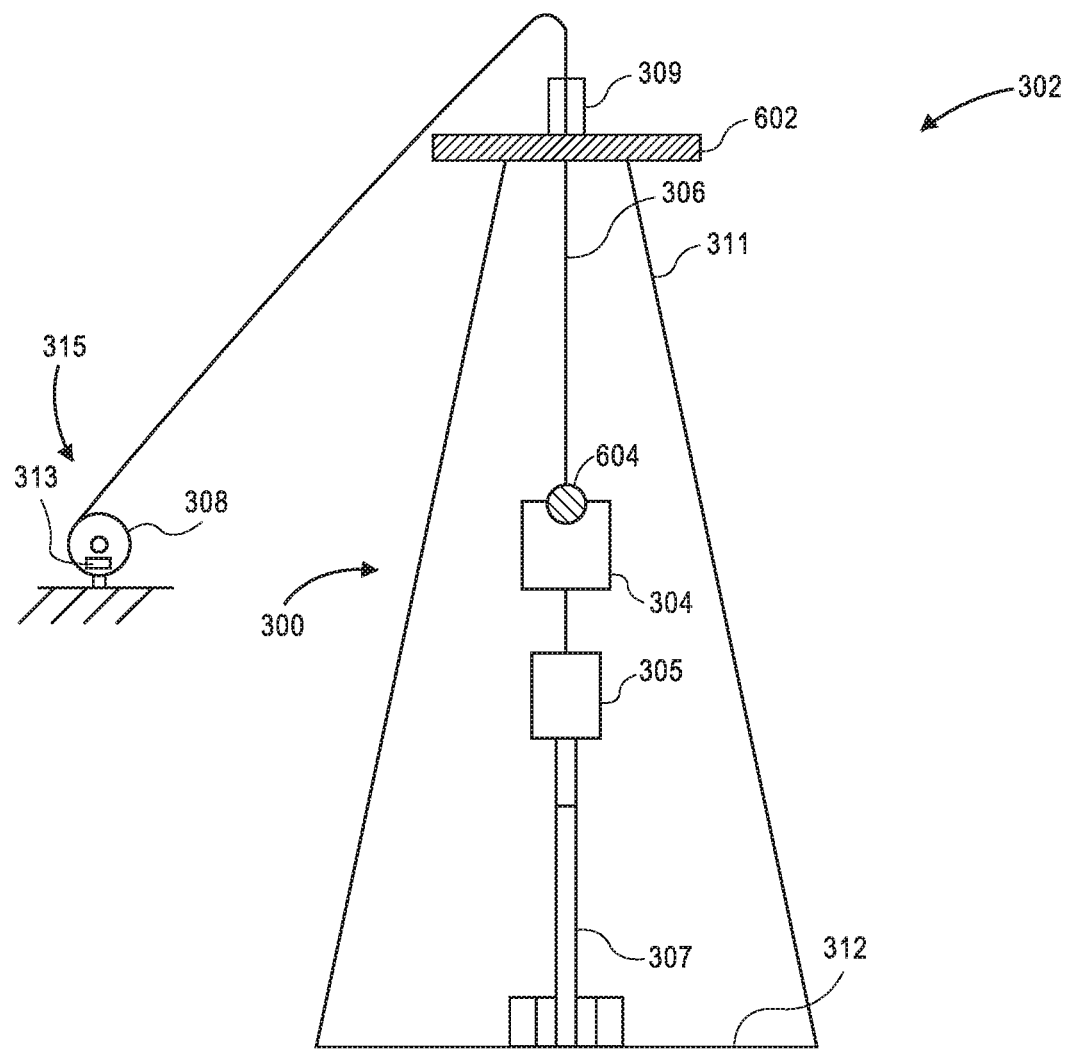

FIG. 6 illustrates a schematic view of the drilling rig 302 with another embodiment of the calibration system 300, according to an embodiment. As shown, a rig feature 602 may be provided as part of the rig 302. The rig feature 602 may serve another function as part of the drilling rig 302, but in other embodiments, it may not. The rig feature 602 may have a distinguishable feature that may be read by a camera 604, again providing the sensor 314 (FIG. 3). The rig feature 602 may, in a specific embodiment, be a rectangular structure with a particular color installed on the rig structural component 311, e.g., below the crown block 309.

The camera 604 may be installed above the travelling block 304. The camera 604 may take a picture of this rig feature 602, and may determine its distance therefrom based on the size of the rig feature 602. By using this method, the elevation of the camera 604, and thus the block 304 and/or drilling device 305 may be determined continuously, e.g., and employed similar to the triangulation embodiment described above with reference to FIGS. 3B and 3C.

Monitoring Pipe Movement

Figure 7:
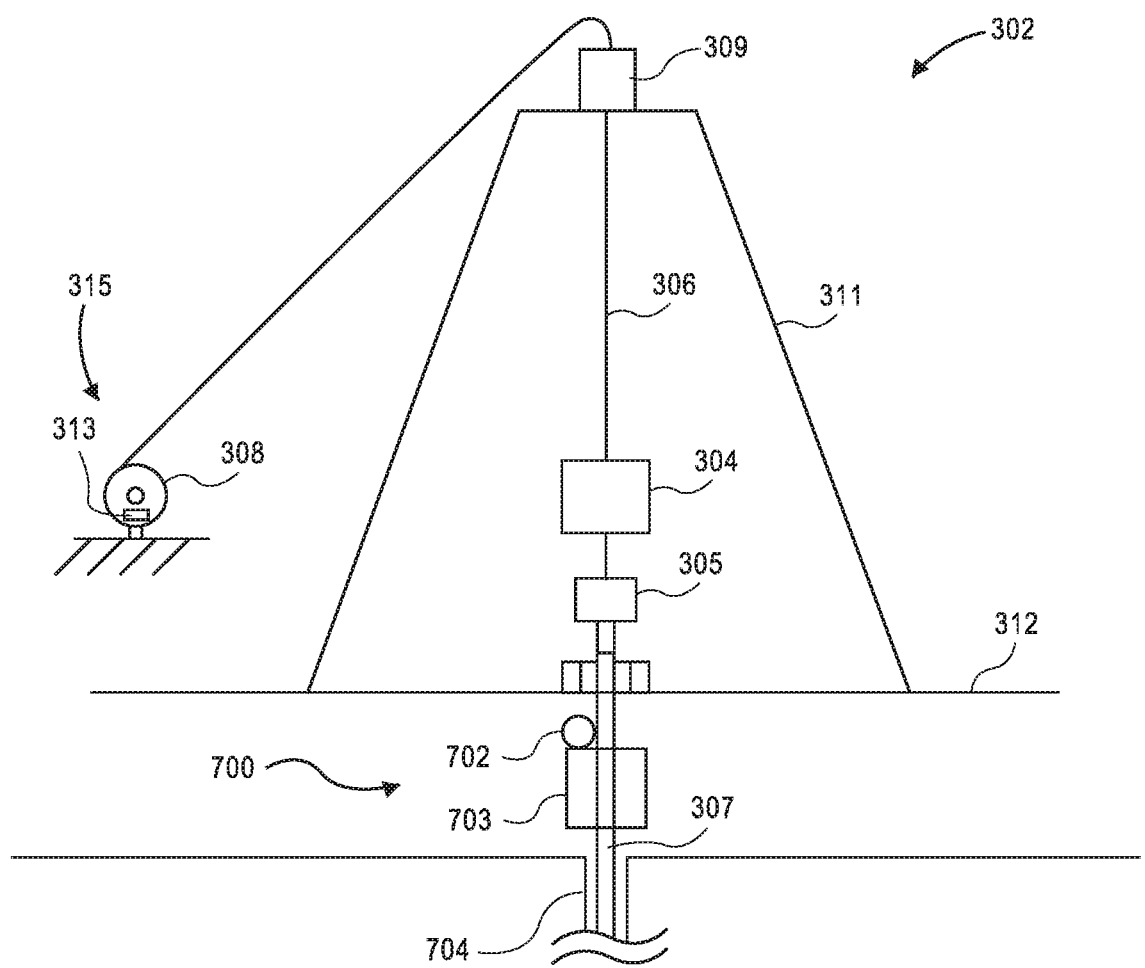
FIG. 7 illustrates a schematic view of a pipe movement tracking system, according to an embodiment.

FIG. 7 illustrates a side, schematic view of the drilling rig 302, including a system 700 for monitoring pipe movement, according to an embodiment. In this embodiment, a camera 702 may be installed near the drill string 307, e.g., below the rig floor 312. The drill string 307 may extend through a blowout preventer (BOP) 703 below the rig floor 312, and into a well 704 below the BOP 703. By continuously taking images of the drill pipe during tripping, and/or rotation, and using pattern recognition algorithm to keep track of the unique features within each image, the movement (rotation speed and/or translation speed) of the drill pipe may be determined. Integrating these speeds over time may allow a calculation of the rotation angle, and translation distance (depth) of the drill pipe.

Increased Accuracy of Drilling Depth Measurement

When a new stand is added to the drill string, and the slips are removed, the weight of drill string is transferred from the slips to the top drive/drill line, causing the drill line to stretch. Depending on the weight of the drill string, this stretch may be several centimeters (or more), but may not be measured by the elevation measurement device (i.e., encoder on the drawworks), as the stretching of the drill line may not cause the reel of the drawworks to rotate.

Figure 8:
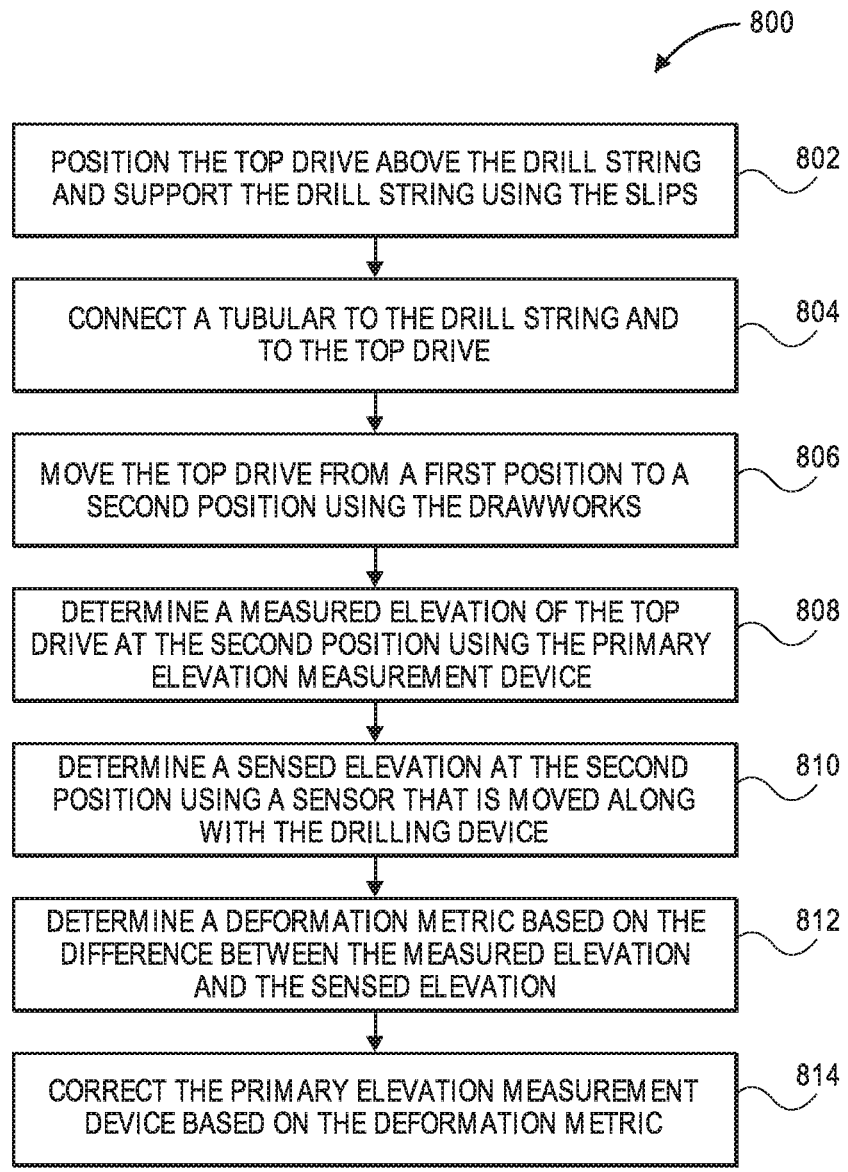
FIG. 8 illustrates a flowchart of a method for measuring a length of a tubular, according to an embodiment.
Figure 9:
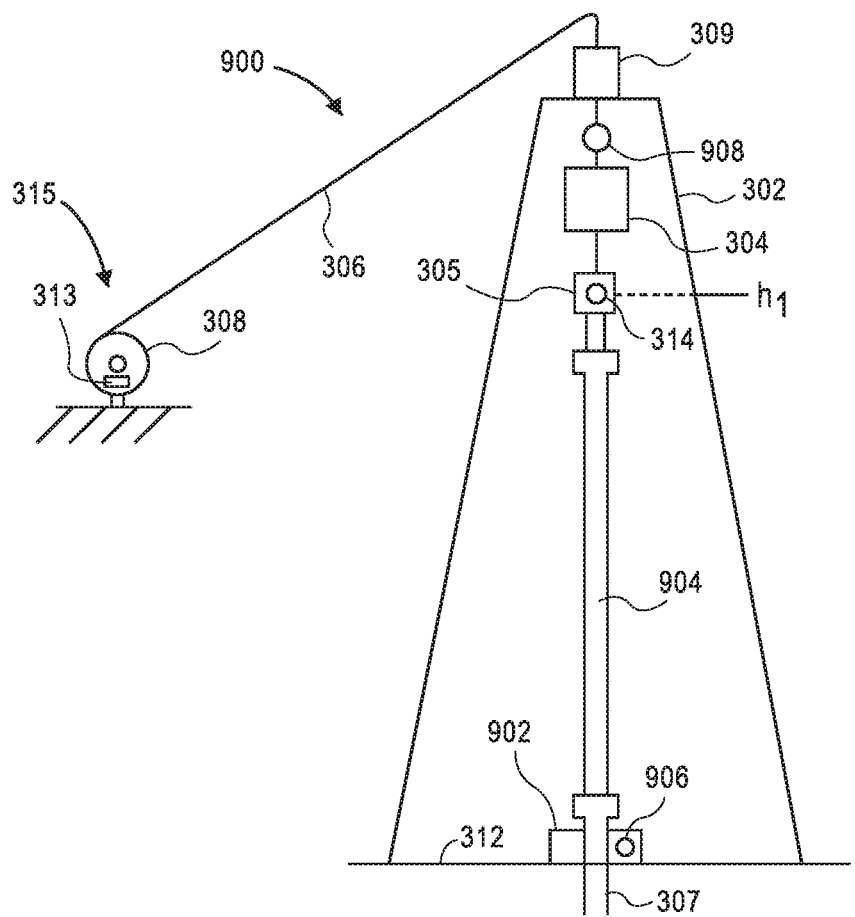
FIGS. 9 and 10 illustrate side, schematic views of a drilling rig at various points during the method of FIG. 8, according to an embodiment.
Figure 10:
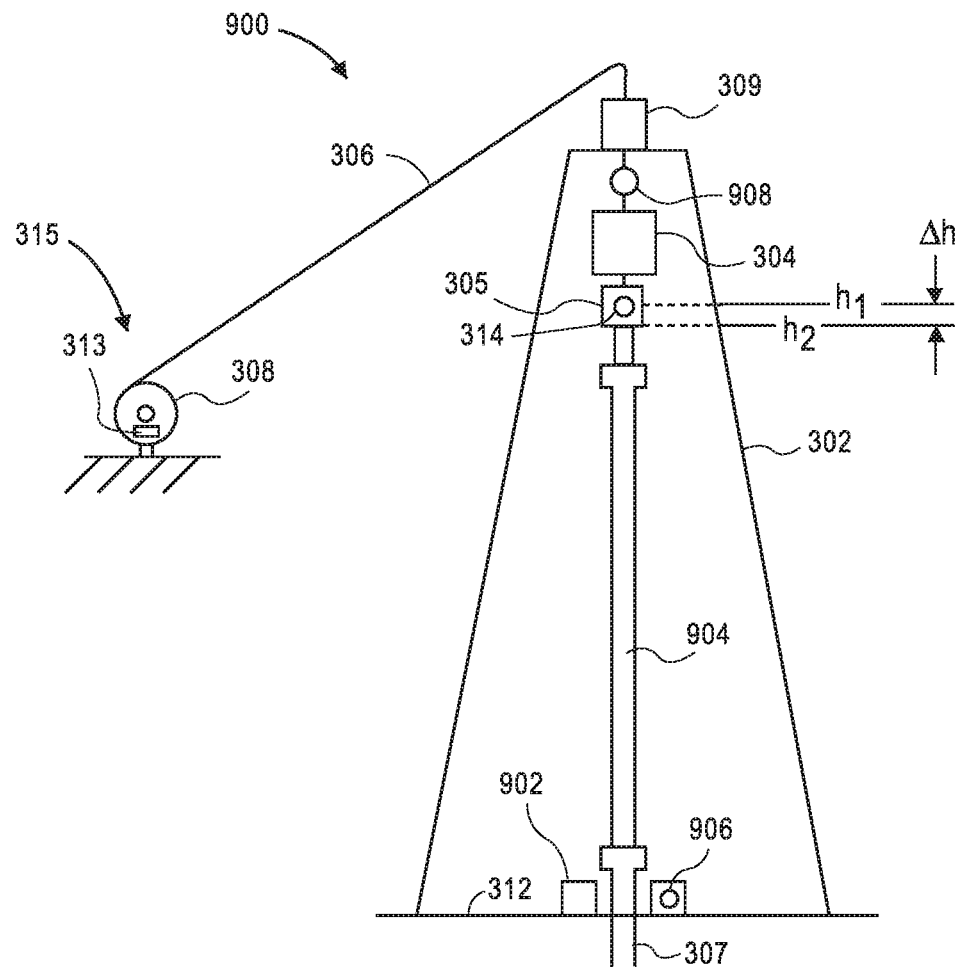

Accordingly, FIG. 8 illustrates a flowchart of a method 800 for drilling a wellbore and considers the stretched length of drill line, according to an embodiment. FIGS. 9 and 10 illustrate side, schematic views of a drilling rig 900 at two points in the operation of the method 800, according to an embodiment. The drilling rig 900 may be generally similar to the drilling rig 302. The drilling rig 900 may include slips 902, which may be positioned at or near the rig floor 312. The slips 902 may receive the drill string 307 therethrough, and may be configured to support the weight of the drill string 307, e.g., as a new stand of tubulars 904 is added or removed.

The slips 902 may include a slips sensor 906 (e.g., a load cell), which may be configured to detect when the slips 902 are supporting the weight of the drill string 307 and, further, may be capable of measuring and sending a signal representing the amount of the load supported thereby (e.g., slips weight $W_S$). Similarly, the drilling rig 900 may also include a load sensor 908, e.g. attached to the drill line 306 (or the drilling device 305, the drum 308, see FIG. 3, or anywhere else suitable), to measure the weight of the drill string 307 being suspended via the drilling device 305. In the specific, illustrated embodiment, the measured, suspended load may be the hookload $W_H$; however, other loads may be measured at locations other than the hook and employed consistent with the method 800.

The method 800 may begin by positioning the drilling device 305 above the drill string 307 at a height $h_1$, while supporting the drill string 307 using the slips 902, as at 802 (e.g., slips weight $W_S$=drill string weight $W_T$; suspended load $W_H$=0). Next, a stand of tubulars 904 (e.g., a tubular segment including one or more joints of pipe, such as drill pipe) may be connected to the drill string 307 and the drilling device 305, as at 804 and as shown in FIG. 9.

The slips 902 may then be released from engagement with the drill string 307. Releasing the slips 902 may transition the weight of the string $W_T$ to the suspended load $W_S$, which may result in the drill line 306 stretching, and thus the drilling device 305 being at the lower height $h_2$, as shown in FIG. 10. The encoder 313 may not register this elevation change.

In some embodiments, the method 800 may also include moving the drilling device 305 from a first position to a second position using the drawworks 315, as at 806. For example, the drilling device 305 may be raised by spooling the drill line 306 on the drum 308, or lowered by unspooling the drill line 306 from the drum 308. In some embodiments, however, the method 800 may not include moving the drilling device 305, and the drilling device 305 may begin in the second position.

Before or after moving the drilling device 305, the method 800 may include determining a measured elevation of the drilling device 305 at the second position using the primary elevation measurement device (e.g., the encoder 313), as at 808. The measured elevation may be determined based on an angular displacement of the drum 308 (which may be corrected for increased layer diameter on drum 308 diameter due to the spooling of the drill line 306) and a known reference elevation.

The method 800 may also include determining a sensed elevation at the second position using a sensor, as at 810. This determination may be made using any of the aforementioned sensors, e.g., those sensors that move with the drilling device 305, the travelling block 304, or both, by operation of the drawworks 315. As such, the sensor may, for example, use markers to determine an actual elevation of the drilling device (e.g., drilling device 305), the travelling block, or both from a reference plane such as the rig floor 312.

The method 800 may also include determining a deformation metric based on the difference between the measured elevation and the sensed elevation, as at 812. The measured elevation, detected by the encoder 313 may be subject to error caused by the stretching of the drill line 306 under the increased weight suspended therefrom provided by the drill string 307 being out of slips. Such stretching may not be registered by the encoder 313, as it may result in an elevation change without a rotation of the drum 308. The deformation metric may be an amount of stretch (e.g., length of stretch) in the drill line 306. In another embodiment, the stress, strain, or both may instead be measured. Later, in some embodiments, the stress or strain may be used to determine the stretch, e.g., taking into consideration the overall length of the drill line 306. However, using the strain may allow for a stretch per unit length to be determined, and thus, so long as the drill string 307 weight remains constant, the strain at any position (e.g., the first position) of the drilling device 305 may be calculated, despite the change in length of the drill string 316 as it is spooled onto or unspooled from the drum 308.

The deformation metric may be employed to correct the primary elevation measurement device, as at 814. For example, if the deformation metric is stretch, the stretch may be subtracted from the measured elevation recorded by the primary elevation measurement device (encoder 313).

In some embodiments, this procedure may be repeated for another position (e.g., the first position), which may provide two points of data for the deformation metric (e.g., stretch) in the drill line 306, and thus the deformation metric may be based on the difference between the measured and sensed elevations at both positions. This may then allow for an interpolation of the deformation metric across the at least a portion (e.g., an entirety) of the range of motion of the drilling device 305 or the travelling block 304.

Determining the Distance Between the Drill Bit and the Bottom of the Well

Figure 11:
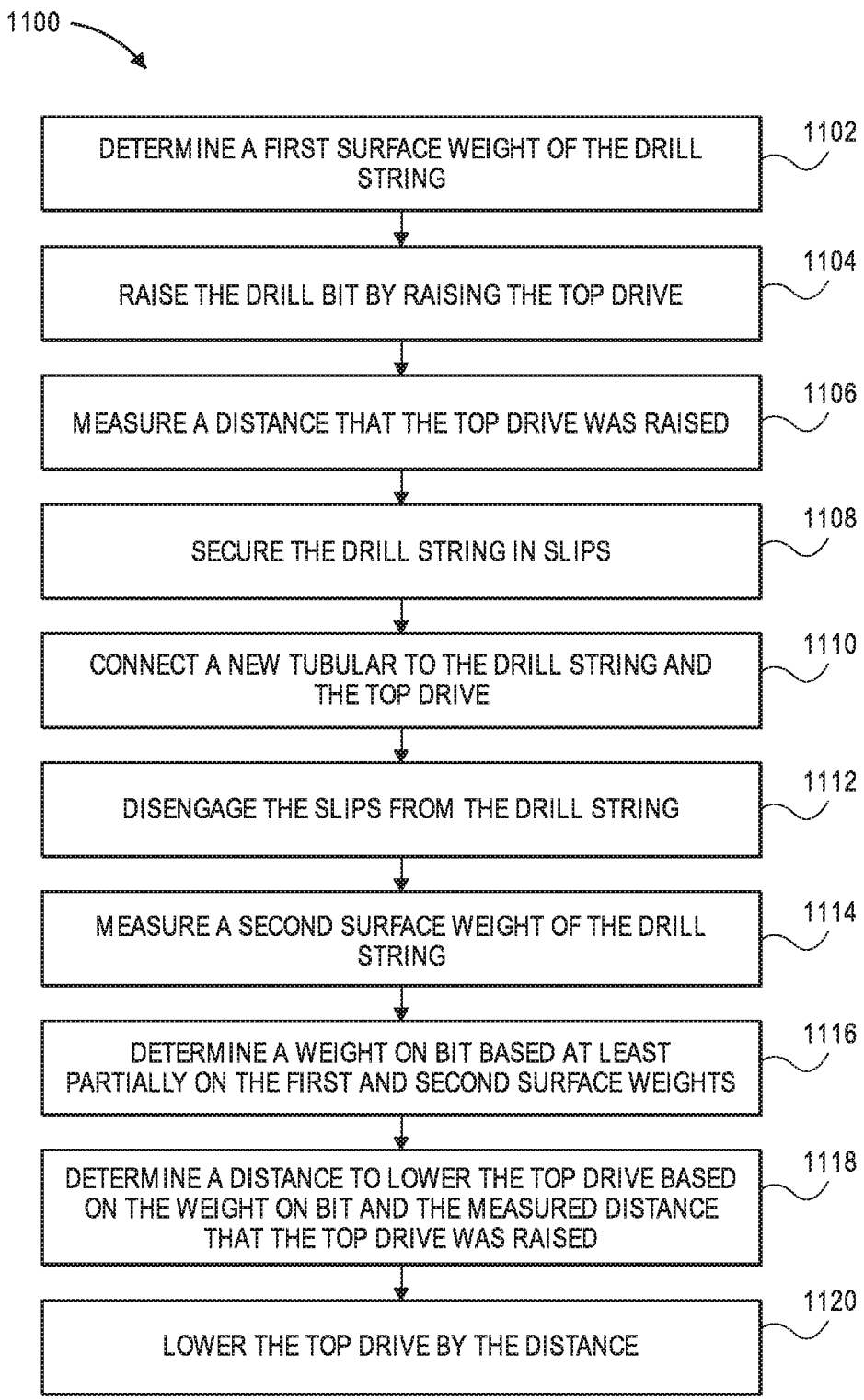
FIG. 11 illustrates a flowchart of a method for drilling, according to an embodiment.
Figure 12:
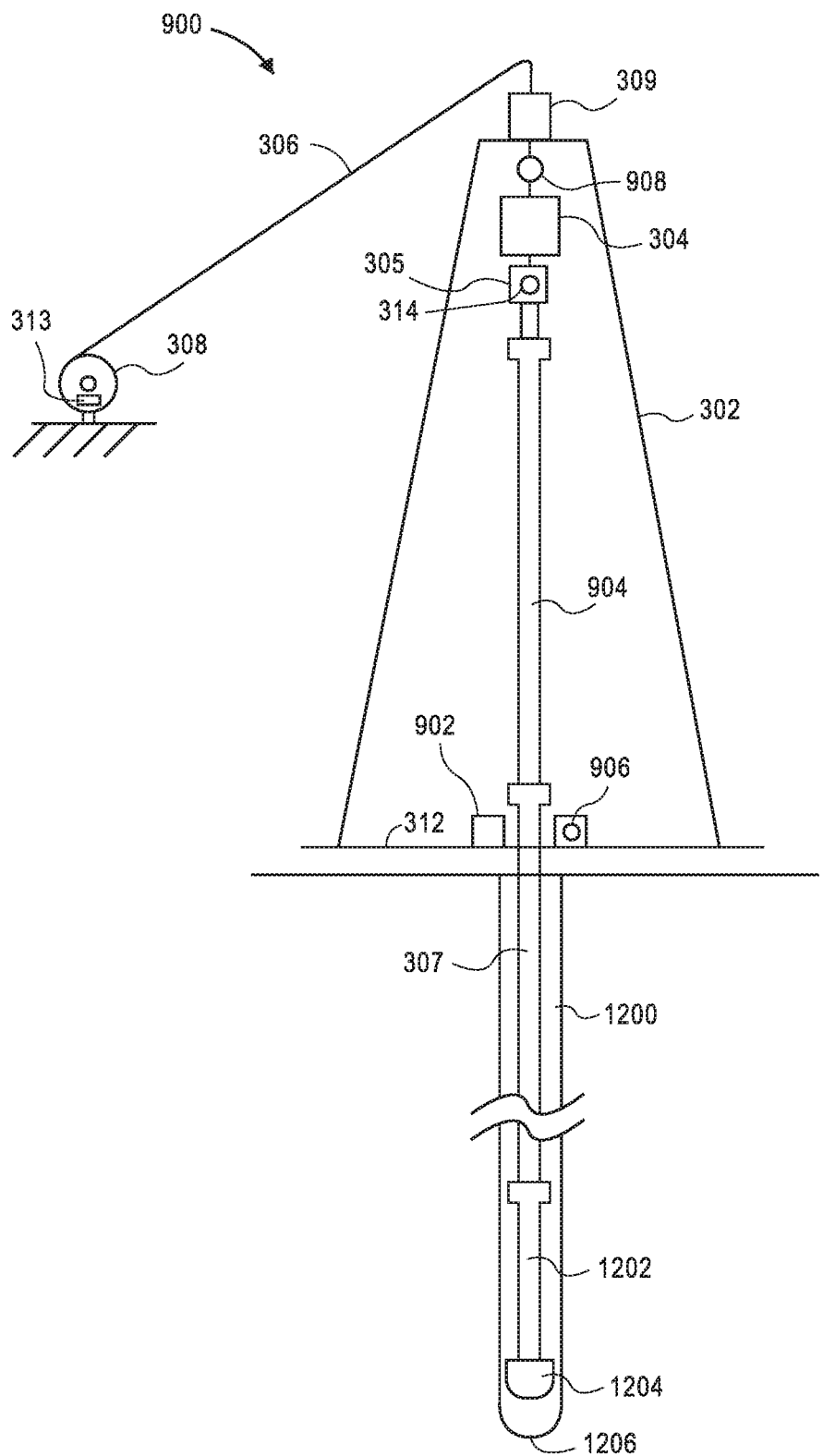
FIG. 12 illustrates a side, schematic view of a drilling rig having a drill string deployed into a wellbore, according to an embodiment.

FIG. 11 illustrates a flowchart of a method 1100 for drilling, which includes determining a distance between the drill bit and the bottom of the wellbore, according to an embodiment. The method 1100 may employ the drilling rig 900, or another drilling rig, with a capability of sensing a position (e.g., elevation) of the drilling device 305, block 304, or another tubular handling device. FIG. 12 illustrates another schematic view of the drilling rig 900, illustrating the running of the drill string 307 in a wellbore 1200, according to an embodiment. In particular, FIG. 12 illustrates a bottom hole assembly 1202 including a drill bit 1204 and a bottom 1206 of the wellbore 1200. The drill bit 1204 may engage the bottom 1206 of the wellbore 1200, so as to bore into the Earth and extend the wellbore 1200.

In general, the drill string 307 may change length during a drilling process, which may affect the driller's ability to determine a distance between the drill bit 1204 and the bottom 1206 of the wellbore 1200, e.g., when adding a new stand of tubulars 904 to the drill string 307. By way of example, the drilling rig 900 may be employed to determine the distance between the drill bit 1204 and the bottom 1206, e.g., using one or more of the embodiments described above, such as calibration, or direct measurement through a triangulation method (sensor 314 is shown in FIG. 12 as an example).

The method 1100 may commence, as an example, at the end of running a tubular stand of the drill string 307 into the well, e.g., with the drill bit 1204 engaged with the bottom 1206 of the wellbore 1200. At this point, the method 1100 may include determining a first surface weight $W_d$ (namely, a load, such as hookload, measured either at the drilling device, or at the deadline drill line anchor) of the drill string 307, as at 1102. The first surface weight $W_d$ may be the hookload, and thus may be measured using the dead drill line anchor, a load cell in the drilling device 305, etc.

A depth of the wellbore ("hole depth") $D_h$ may be expressed in terms of the length of the drill string 307. The length of the drill string 307 may account for stretching and/or compression of the drill string 307 during operation. For example, let L be the length of the drill string 307 below the drilling device 305 under no axial load. During drilling, the actual length $L_d$ of the drill string below the drilling device 305 may be expressed as:

$$L_d = L + \Delta L_w + \Delta L_T - \Delta L_f - \Delta L_{wob} - \Delta L_s \quad (5)$$

where $\Delta L_w$ is the change of drill string length due to its weight and wellbore pressure, $\Delta L_T$ is the change of drill string length due to temperature, $\Delta L_f$ is the change of drill string length due to the friction force between the drill string and the wellbore, $\Delta L_{wob}$ is the change of the drill string length due to the weight-on-bit, and $\Delta L_s$ is the length of the drill string 307 between the rig floor 312 and the drilling device 305.

During tripping out, the length $L_o$ of the drill string 307 below the rig floor 312 may be expressed as $$L_o = L + \Delta L_w + \Delta L_T + \Delta L_f - \Delta L_s \quad (6)$$

The hole depth $D_h$ may thus be expressed as (note: $\Delta L_s$ is the distance between the drilling device and the rig floor):

$$D_h = L + \Delta L_w + \Delta L_T - \Delta L_f - \Delta L_{wob} - \Delta L_s \quad (7)$$

The bit 1204 may then be raised off of the bottom 1206 of the wellbore 1200, e.g., by raising the drilling device 305 by a distance s, as at 1104. The distance s may be measured, as at 1106 e.g., using the encoder 313 of the drawworks 315 and/or any of the elevation measurement embodiments, including the calibration and triangulation methods, using one or more sensors 314, 504, as described above. After raising the bit 1204 off of the bottom 1206, the slips 902 may be set, e.g. by engaging teeth thereof with the drill string 307, so as to secure and support the drill string 307, as at 1108.

With the measurement of the distance s obtained, the following relationship may be established:

$$s = D_h - D_b \quad (8)$$

If $s > 2\Delta L_f + \Delta L_{wob}$, the bit depth $D_b$ may be expressed as:

$$D_b = L_o - \Delta L_s - s = L + \Delta L_w + \Delta L_T + \Delta L_f - \Delta L_s - s \quad (9)$$

The distance between the bit and the bottom end of the hole $\Delta D_b$ may be expressed as:

$$\Delta D_b = D_h - D_b = s - 2\Delta L_f - \Delta L_{wob} \quad (10)$$

The method 1100 may then proceed to connecting a new stand of tubulars 904 to the drilling device 305 and the drill string 307 supported in the slips 902, as at 1110. After connecting the new tubular 907 at 1110, the slips 902 may be disengaged and the drilling device 305 may support the drill string 307, as at 1112.

The method 1100 may then include measuring a second surface weight $W_t$ (another measurement of the load, e.g., hookload, measured either at the drilling device, or at or near the deadline anchor) of the drill string 307 with the new stand of tubulars 904, and prior to lowering the drill bit into engagement with the bottom of the wellbore, as at 1114. A relationship between the first surface weight $W_d$ and the second surface weight $W_t$ reveals the weight-on-bit WOB, which may be determined at 1116. The weight-on-bit WOB may be expressed as (note $W_S$ is the weight of the stand just added to the drill string from the surface):

$$WOB = W_d - (W_t - W_s) \quad (11)$$

The method 1100 may then include determining a distance t to lower the drilling device 305, such that the drill bit 1204 engages the bottom 1206 of the wellbore 1200, based on the distance s that the drilling device 305 was raised, and the weight-on-bit WOB, as at 1118. The distance t may be expressed as:

$$D_b + t - 2\Delta L_f = D_h \quad (12)$$

Substituting equation 10 into equation 12, yields:

$$t = s - \Delta L_{wob} \quad (13)$$

$\Delta L_{wob}$ may be determined as $$\Delta L_{wob} = \frac{WOB * L}{E} * \left\langle \frac{1}{A} \right\rangle \quad (14)$$

where E is Young's modulus, and A is the drill string cross-sectional area, and <1/A> refers to the average of the inverse of the drill string cross-sectional area. Thus, the distance for the drilling device 305 to be moved before the drill bit 1204 reaches the bottom 1206 of the wellbore 1200 may be:

$$t = s - \frac{WOB * L}{EA} * \left\langle \frac{1}{A} \right\rangle \quad (15)$$

Since the distance s and the weight-on-bit WOB may be known from the measurements and calculations above, and the dimensions and Young's modulus of the drill string 307 may also be known, the distance t may be readily calculated. The method 1100 may then proceed to lowering the drilling device 305 by the distance t, such that the drill bit 1204 engages the bottom 1206 of the wellbore 1200, for further drilling, as at 1120. The engagement may be controlled, such that the drill bit 1204 is not caused to impact the bottom 1206 at a high rate of speed, since the distance across which the drilling device 305 is to be lowered has been determined.

Figure 13:
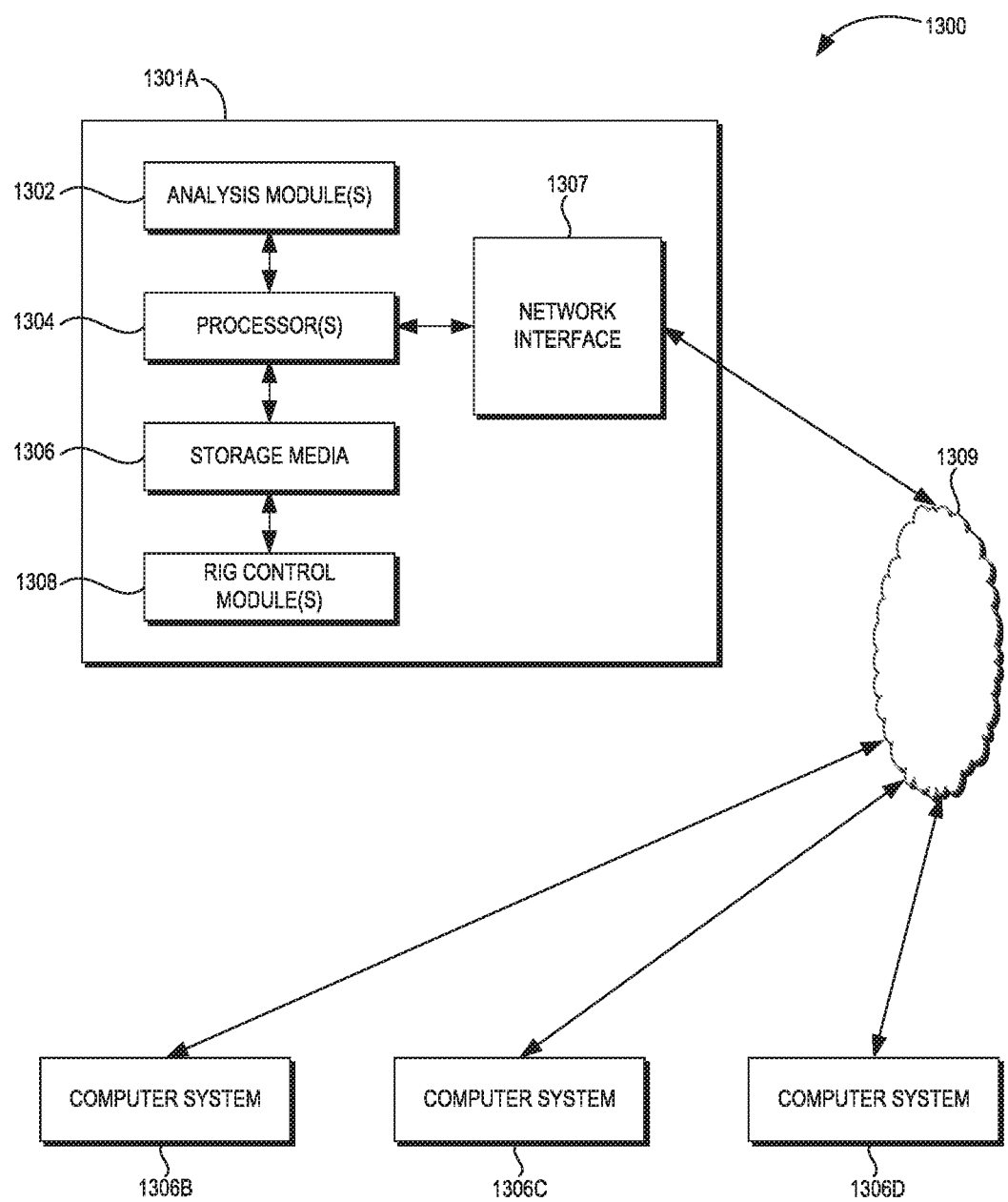
FIG. 13 illustrates a schematic view of a computing system, according to an embodiment.

In some embodiments, the methods of the present disclosure may be executed by a computing system. FIG. 13 illustrates an example of such a computing system 1300, in accordance with some embodiments. The computing system 1300 may include a computer or computer system 1301A, which may be an individual computer system 1301A or an arrangement of distributed computer systems. The computer system 1301A includes one or more analysis modules 1302 that are configured to perform various tasks according to some embodiments, such as one or more methods disclosed herein. To perform these various tasks, the analysis module 1302 executes independently, or in coordination with, one or more processors 1304, which is (or are) connected to one or more storage media 1306. The processor(s) 1304 is (or are) also connected to a network interface 1307 to allow the computer system 1301A to communicate over a data network 1309 with one or more additional computer systems and/or computing systems, such as 1301B, 1301C, and/or 1301D (note that computer systems 1301B, 1301C and/or 1301D may or may not share the same architecture as computer system 1301A, and may be located in different physical locations, e.g., computer systems 1301A and 1301B may be located in a processing facility, while in communication with one or more computer systems such as 1301C and/or 1301D that are located in one or more data centers, and/or located in varying countries on different continents).

A processor may include a microprocessor, microcontroller, processor module or subsystem, programmable integrated circuit, programmable gate array, or another control or computing device.

The storage media 1306 may be implemented as one or more computer-readable or machine-readable storage media. Note that while in the example embodiment of FIG. 13 storage media 1306 is depicted as within computer system 1301A, in some embodiments, storage media 1306 may be distributed within and/or across multiple internal and/or external enclosures of computing system 1301A and/or additional computing systems. Storage media 1306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1300 contains one or more rig control module(s) 1308. In the example of computing system 1300, computer system 1301A includes the rig control module 1308. In some embodiments, a single rig control module may be used to perform some or all aspects of one or more embodiments of the methods disclosed herein. In alternate embodiments, a plurality of rig control modules may be used to perform some or all aspects of methods herein.

The computing system 1300 is one example of a computing system; in other examples, the computing system 1300 may have more or fewer components than shown, may combine additional components not depicted in the example embodiment of FIG. 13, and/or the computing system 1300 may have a different configuration or arrangement of the components depicted in FIG. 13. The various components shown in FIG. 13 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for drilling a wellbore, comprising:
measuring a first distance that a drilling device is raised while connected to a drill string;
determining a weight-on-bit in the drill string;
determining a second distance to lower the drilling device such that a drill bit at a lower extremity of the drill string approaches toward a bottom of the wellbore, based on the first distance and the weight-on-bit; and
lowering the drilling device by the second distance.

2. The method of claim 1, wherein the second distance to lower the drilling device comprises a distance such that the drill bit engages the bottom of the wellbore.

3. The method of claim 1, wherein determining the weight-on-bit in the drill string comprises measuring the weight-on-bit at the lower extremity of the drill string, and transmitting the measurement to a surface.

4. The method of claim 1, wherein determining the weight-on-bit comprises:
determining a first weight measured at a surface when the drill string is engaged to the bottom of the well; and
determining a second weight measured at the surface when the drill string is raised from the bottom of the well, wherein the weight-on-bit is determined at least partially based on the first and second weights.

5. The method of claim 4, wherein determining the second distance comprises using the first distance and determining a drill string deformation due to the weight-on-bit.

6. The method of claim 5, further comprising:
raising the drilling device by the first distance while the drilling device is connected to the drill string, after determining the first weight;
securing the drill string in slips after raising the drilling device by the first distance;
disconnecting the drilling device from the drill string;
connecting one or more tubulars to the drilling device and to the drill string, while the drill string is secured in the slips; and
disengaging the slips from the drill string,
wherein determining the second weight is performed after disengaging the slips from the drill string.

7. A drilling rig system, comprising:
a drilling device configured to rotate a drill string;
a rig floor through which the drill string is received;
a drawworks coupled to the drilling device via a drill line, wherein the drawworks is configured to raise and lower the drilling device with respect to the rig floor by spooling and unspooling the drill line;
a sensor configured to determine an elevation of the drilling device; and
a computing device configured to cause the drilling rig system to perform operations, the operations comprising:
measuring a first distance that the drilling device is raised while connected to the drill string;
determining a weight-on-bit in the drill string;
determining a second distance to lower the drilling device such that a drill bit at a lower extremity of the drill string approaches toward a bottom of a wellbore, based on the first distance and the weight-on-bit; and
lowering the drilling device by the second distance.

8. The system of claim 7, wherein the sensor is coupled to the drilling device and is movable therewith by operation of the drawworks.

9. The system of claim 7, further comprising a plurality of markers that are stationary with respect to the rig floor, wherein the sensor is configured to detect the plurality of markers.

10. The system of claim 9, wherein the plurality of markers comprise radio frequency identification (RFID) tags positioned at two or more elevations from the rig floor, wherein the sensor comprises an RFID tag reader, such that the sensor is configured to detect proximity to the plurality of markers and to distinguish between the plurality of markers, and wherein the computing device is configured to determine an elevation of the drilling device based on the RFID tag reader detecting proximity to a specific one of the plurality of markers.

11. The system of claim 9, wherein the sensor is coupled to the drilling device, and wherein the computing device is configured to triangulate a position of the drilling device based on an angle between the sensor and two or more of the plurality of markers.

12. The system of claim 7, wherein determining the second distance comprises using the first distance and determining a drill string deformation due to the weight-on-bit.

13. The system of claim 7, wherein determining the weight on bit comprises receiving a signal representing the weight-on-bit from a sensor in a bottom-hole assembly of the drill string.

14. The system of claim 7, wherein determining the weight-on-bit comprises:
determining a first weight measured at a surface when the drill string is engaged to the bottom of the wellbore; and
determining a second weight measured at the surface when the drill string is raised from the bottom of the wellbore, wherein the weight-on-bit is determined at least partially based on the first and second weights.

15. The system of claim 14, wherein the operations further comprise:
raising the drilling device by the first distance while the drilling device is connected to the drill string, after determining the first weight;
securing the drill string in slips after raising the drilling device by the first distance;
disconnecting the drilling device from the drill string;
connecting one or more tubulars to the drilling device and to the drill string, while the drill string is secured in the slips; and
disengaging the slips from the drill string,
wherein determining the second weight is performed after disengaging the slips from the drill string.

* * * * *